(12) United States Patent
Jeong et al.

(10) Patent No.: US 10,573,933 B2
(45) Date of Patent: Feb. 25, 2020

(54) LITHIUM METAL BATTERY

(71) Applicant: Samsung Electronics Co., Ltd., Suwon-si, Gyeonggi-do (KR)

(72) Inventors: Joonseon Jeong, Seoul (KR); Yooseong Yang, Yongin-si (KR); Hyorang Kang, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 239 days.

(21) Appl. No.: 15/152,792

(22) Filed: May 12, 2016

(65) Prior Publication Data

US 2016/0336625 A1   Nov. 17, 2016

(30) Foreign Application Priority Data

May 15, 2015   (KR) .................. 10-2015-0068184

(51) Int. Cl.
*H01M 10/42*   (2006.01)
*H01M 4/131*   (2010.01)
(Continued)

(52) U.S. Cl.
CPC ..... *H01M 10/4235* (2013.01); *H01M 2/1653* (2013.01); *H01M 4/131* (2013.01); *H01M 4/134* (2013.01); *H01M 4/1395* (2013.01); *H01M 4/382* (2013.01); *H01M 4/525* (2013.01); *H01M 4/623* (2013.01); *H01M 4/625* (2013.01); *H01M 10/0525* (2013.01); *H01M 10/0568* (2013.01); *H01M 10/0569* (2013.01);
(Continued)

(58) Field of Classification Search
CPC ......... H01M 10/4235; H01M 10/0525; H01M 10/0585; H01M 10/0568; H01M 10/0569; H01M 4/382; H01M 4/131; H01M 4/134; H01M 4/525; H01M 4/625; H01M 4/623; H01M 2/1653; H01M 2004/027
USPC .................................................. 429/247–255
See application file for complete search history.

(56) References Cited

U.S. PATENT DOCUMENTS 5,437,804 A  *  8/1995  Yamamoto ............. H01B 1/122
                                                         252/182.1
5,888,666 A  *  3/1999  Kawakami ............. H01M 2/16
                                                         429/145
(Continued)

FOREIGN PATENT DOCUMENTS

EP         1365922         12/2003
KR    1020050030762 A      3/2005
(Continued)

OTHER PUBLICATIONS

Wong et al., "Nonflammable perfluoropolyether-based electrolytes for lithium batteries", PNAS, vol. 111, No. 9, Mar. 4, 2014, pp. 3327-3331.
(Continued)

*Primary Examiner* — Osei K Amponsah
(74) *Attorney, Agent, or Firm* — Cantor Colburn LLP

(57) ABSTRACT

A lithium metal battery includes: a positive electrode, a negative electrode including lithium, a liquid electrolyte disposed between the positive electrode and the negative electrode, and a protective layer disposed on at least a portion of the negative electrode, wherein the protective layer includes a first polymer selected from at least one of a poly(vinyl alcohol) and a poly(vinyl alcohol) blend.

27 Claims, 11 Drawing Sheets

(51) Int. Cl.
*H01M 4/134* (2010.01)
*H01M 4/525* (2010.01)
*H01M 10/0569* (2010.01)
*H01M 4/38* (2006.01)
*H01M 4/62* (2006.01)
*H01M 2/16* (2006.01)
*H01M 10/0525* (2010.01)
*H01M 10/0585* (2010.01)
*H01M 10/0568* (2010.01)
*H01M 4/1395* (2010.01)
*H01M 4/02* (2006.01)
*H01M 4/04* (2006.01)
*H01M 4/1391* (2010.01)

(52) U.S. Cl.
CPC ...... *H01M 10/0585* (2013.01); *H01M 4/0402* (2013.01); *H01M 4/0404* (2013.01); *H01M 4/0471* (2013.01); *H01M 4/1391* (2013.01); *H01M 2004/027* (2013.01); *H01M 2004/028* (2013.01); *H01M 2220/20* (2013.01); *H01M 2300/0034* (2013.01); *H01M 2300/0037* (2013.01)

(56) References Cited

U.S. PATENT DOCUMENTS

| | | |
|---|---|---|
| 6,488,721 B1 | 12/2002 | Carlson |
| 7,081,142 B1 | 7/2006 | Carlson |
| 7,745,048 B2 | 6/2010 | Hwang et al. |
| 2002/0187401 A1* | 12/2002 | Lee .................. B01D 67/0027 429/303 |
| 2004/0072066 A1 | 4/2004 | Cho et al. |
| 2005/0266150 A1* | 12/2005 | Yong .................. H01M 2/166 427/58 |
| 2009/0136833 A1* | 5/2009 | Lee .................. H01M 2/0275 429/122 |
| 2009/0297949 A1* | 12/2009 | Berkowitz .............. H01M 2/08 429/221 |
| 2011/0143183 A1* | 6/2011 | Matsumoto ......... H01M 2/1626 429/144 |
| 2012/0276459 A1 | 11/2012 | Im et al. |
| 2013/0115484 A1* | 5/2013 | Li .................... H01M 2/166 429/50 |
| 2013/0164597 A1* | 6/2013 | Park .................. H01M 2/16 429/145 |
| 2014/0220439 A1 | 8/2014 | Badding et al. |
| 2014/0231719 A1* | 8/2014 | Cha .................. H01M 4/622 252/503 |
| 2014/0272595 A1 | 9/2014 | Cristadoro et al. |
| 2015/0372358 A1 | 12/2015 | Izumi et al. |

FOREIGN PATENT DOCUMENTS

| | | |
|---|---|---|
| KR | 1020050038905 A1 | 4/2005 |
| KR | 1020120122674 A | 11/2012 |
| KR | 1020140060044 A | 5/2014 |
| KR | 1020140112597 A | 9/2014 |
| WO | 02/50933 A2 | 6/2002 |
| WO | 02072361 A1 | 9/2002 |

OTHER PUBLICATIONS

S. Rajendran*, et al., "Effect of salt concentration in poly(vinyl alcohol)-based solid polymer electrolytes", Journal of Power Sources, 124, 2003, pp. 225-230.

European Search Report for European Patent Application No. 16 169 702.4 dated Jun. 19, 2017.

European Search Report for European Patent Application No. 16169702.4 dated Aug. 4, 2016.

Ma et al., "Enhanced cycle performance of a Li—S Battery based on a protected lithium anode", Journal of Materials Chemisty A, vol. 2, 2014, 19355.

* cited by examiner

LITHIUM METAL BATTERY

CROSS-REFERENCE TO RELATED APPLICATION

This application claims priority to and the benefit of Korean Patent Application No. 10-2015-0068184, filed on May 15, 2015, in the Korean Intellectual Property Office, and all the benefits accruing therefrom under 35 U.S.C. § 119, the content of which in its entirety is herein incorporated by reference.

BACKGROUND

1. Field

The present disclosure relates to a lithium metal battery including a negative electrode which includes lithium.

2. Description of the Related Art

Lithium secondary batteries are high-performance batteries having a high energy density compared to other currently available secondary batteries, and may be applicable in various fields such as electric vehicles.

A lithium secondary battery may use a lithium metal thin film as a negative electrode. However, a lithium secondary battery including such a lithium metal thin film may have reduced lifespan and stability. Therefore, there is a need for an improved lithium secondary battery.

SUMMARY

Provided is a lithium metal battery including a protective layer having good mechanical properties.

Additional aspects will be set forth in part in the description which follows and, in part, will be apparent from the description, or may be learned by practice of the presented exemplary embodiments.

According to an aspect of an exemplary embodiment, a lithium metal battery includes a positive electrode; a negative electrode including lithium; a liquid electrolyte disposed between the positive electrode and the negative electrode; and a protective layer disposed on at least a portion of the negative electrode, wherein the protective layer includes a first polymer selected from at least one of a poly(vinyl alcohol) and a poly(vinyl alcohol) blend.

According to another aspect, a method of preparing a lithium metal battery includes, providing a positive electrode, providing a negative electrode including lithium, disposing a liquid electrolyte between the positive electrode and the negative electrode, and forming a protective layer on at least a portion of a surface of the negative electrode, wherein the protective layer includes a first polymer selected from at least one of a poly(vinyl alcohol) and a poly(vinyl alcohol blend)

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Figure 1:
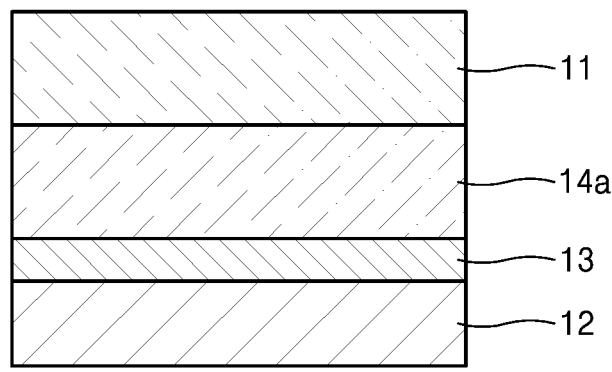
FIGS. 1 and 2 are schematic views each illustrating a structure of a lithium metal battery according to an exemplary embodiment.

Reference will now be made in detail to exemplary embodiments, of a negative electrode for a lithium metal battery and a lithium metal battery including the negative electrode, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "t op," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an exemplary embodiment, a lithium metal battery may include a negative electrode including lithium, a positive electrode, a liquid electrolyte disposed between the lithium negative electrode and the positive electrode, and a protective layer disposed on at least a portion of the lithium negative electrode, the protective layer including a first polymer selected from at least one of a poly(vinyl alcohol) (PVA) and a PVA blend.

The protective layer may have a tensile modulus of greater than or equal to about 10.0 megaPascals (MPa) at a temperature of 25° C. and an elongation of greater than or equal to about 50% at a temperature of 25° C. In addition, the protective layer may have a peel strength of greater than or equal to about 5.0 MPa at a temperature of 25° C.

The negative electrode may include a lithium metal or lithium metal alloy. The liquid electrolyte may be, for example, disposed on the negative electrode.

For example, the protective layer may have a tensile modulus in a range of about 20 MPa to about 1,000 MPa and a peel strength of greater than or equal to about 10.0 MPa at a temperature of 25° C. In addition, for example, the protective layer may have an elongation of at least about 100%.

The first polymer may have a cross-linked structure. When the protective layer includes the first polymer having a cross-linked structure, a mechanical strength of the protective layer may be further improved. The first polymer having a cross-linked structure may be obtained by contacting the first polymer and a cross-linking agent.

The negative electrode has a large electric capacity per unit weight, and thus may be used to implement a high-capacity battery. However, when the negative electrode includes lithium, the lithium may react with a liquid electrolyte during charging or discharging of the battery. This high reactivity may lead to dendritic growth on the negative electrode including lithium. Accordingly, due to dendritic formation and growth during intercalation/deintercalation of lithium ions in the negative electrode, short-circuiting may occur between the positive electrode and the negative electrode. In addition, since the lithium negative electrode is highly reactive with an electrolyte, side reactions which occur between the lithium and the electrolyte may result in degradation in the cycle life of the lithium metal battery. Over time, repeated charging and discharging of the lithium battery causes changes in battery volume and thickness, resulting in deintercalation of lithium from the negative electrode. In this regard, it would be useful to include a protective layer which compensates for a lithium metal surface and which is capable of decreasing reactions which occur between the negative electrode and the electrolyte.

The protective layer according to an exemplary embodiment may include a first polymer selected from at least one of a poly(vinyl alcohol) and a poly(vinyl alcohol) blend, which may be prepared at low cost. The first polymer accordingly includes poly(vinyl alcohol) having a hydroxyl group, thereby exhibiting polarity overall. Thus, when the first polymer is disposed on at least a portion of the lithium negative electrode, a reaction between a non-polar electrolyte and the lithium in the negative electrode may be effectively reduced. In addition, an interface between the electrolyte and the lithium negative electrode may be stabilized by maintaining current and ion distribution more evenly on a surface of the lithium negative electrode, and accordingly, the dendritic formation and growth on the lithium metal surface may be suppressed. In addition, due to the polarity of the first polymer, the first polymer is only slightly, if at all, dissolved in a liquid electrolyte such as a carbonate organic solvent, an ether organic solvent, or an ionic liquid. Thus, the protective layer of the present inventive concept, which is different from a polyethylene oxide-based protective layer in the related art, has excellent chemical resistance against a liquid electrolyte such as a carbonate organic solvent. Moreover, the protective layer of the present inventive concept also has the excellent effect of suppressing the short-circuiting inside a battery which may be caused by cracks or the like in the protective layer.

The protective layer according to an exemplary embodiment may have excellent mechanical properties such as tensile modulus and elongation. In addition, a hydrogen of the hydroxyl group included in the first polymer of the protective layer may form a hydrogen bond with an oxygen of a hydroxyl group on the lithium metal surface. Consequently, the protective layer may have excellent binding strength to the negative electrode, and thus, during repeated charging and discharging, the protective layer may be prevented from reducing the binding strength thereof. When the lithium metal battery includes the protective layer according to an exemplary embodiment, due to a strong adhesive strength of poly(vinyl alcohol) or poly(vinyl alcohol) blend, the lithium metal may be uniformly disposed during charging and discharging of the lithium metal battery, thereby stabilizing the lithium and extending the lifespan of the lithium metal battery. In addition, the protective layer may be easily coated on the lithium metal surface, and thus based on excellent film formation characteristics, the protective layer may be stable against volume changes which may occur during charging and discharging of the battery. In addition, based on excellent dissolution of lithium salts, the protective layer may also have excellent ion conductivity.

The weight-average molecular weight (Mw) of the first polymer of the protective layer may be about 30,000 Daltons or more, for example, in a range of about 50,000 Daltons to about 200,000 Daltons, or for example, in a range of about 80,000 Daltons to about 100,000 Daltons. The average degree of polymerization of the first polymer may be in a range of about 500 to about 3,000. When the weight-average molecular weight Mw of the first polymer is less than 30,000 Daltons, the protective layer may have degraded mechanical properties. When the weight-average molecular weight and the average degree of polymerization of the first polymer are within the ranges above, the protective layer may have excellent film properties along with excellent tensile modulus and elongation.

When the first polymer includes a poly(vinyl alcohol) (PVA), the number of free hydroxyl groups per a weight average molecular weight of the PVA is as follows.

When the weight-average molecular weight of the PVA is about 200 K Daltons (Da) (where, K is $10^3$), the number of free hydroxyl groups may be about 4,500, when the weight-average molecular weight of the PVA is about 130 K (i.e., 130,000 Da), the number of free hydroxyl groups may be about 3,000, when the weight-average molecular weight of the PVA is about 98 K, the number of free hydroxyl groups may be about 2,000, and when the weight-average molecular weight of the PVA is about 50 K Da, the number of free hydroxyl groups may be about 1,000.

A saponification value of the first polymer may be about 85 mole percent (mol %) or more, for example, in a range of about 85 mol % to about 99.9 mol %, for example, in a range of about 88 mol % to about 99 mol %, or for example, about 95 mol % to about 99 mol %. When the saponification value of the first polymer is within the ranges above, the protective layer may have excellent film properties and surface properties associated with a surface between the protective layer and the negative electrode. In addition, the protective layer may also have excellent tensile modulus and elongation. Regarding a peel strength between the protective layer and the negative electrode, the protective layer of the present inventive concept may have improved peel strength as compared to that of a protective layer in the related art (e.g. a polyethylene oxide protective layer).

A glass transition temperature of the first polymer may be in a range of about 20° C. to about 100° C., for example, about 40° C. to about 80° C. In this regard, the protective layer including the first polymer may have excellent thermal properties. Thus, when the lithium metal battery including the protective layer is used, a lithium battery having excellent cycle properties may be manufactured.

The protective layer according to an embodiment may include a lithium salt. When the protective layer includes i) PVA or a PVA blend, and ii) a lithium salt, the protective layer may have an amorphous structure. A mixing weight ratio of i) the PVA or the PVA blend to ii) the lithium salt may be in a range of about 0.35:1 to about 3:1, and for example, about 0.375:1 (3:8) to about 0.75:1 (3:4).

In another exemplary embodiment, the mixing weight ratio of i) the PVA or the PVA blend to ii) the lithium salt in the protective layer may be about 3:1, about 3:2, about 0.75:1 (3:4), or about 0.375:1 (3:8).

When the mixing weight ratio of i) the PVA or the PVA blend to ii) the lithium salt is in a range of about 0.375:1 (3:8) to about 0.75:1 (3:4), the protective layer may have a 100% amorphous structure.

When the protective layer has the amorphous structure as described above, the protective layer may have improved ion conductivity.

The ion conductivity of the protective layer may be at least $1 \times 10^{-5}$ Siemens per centimeter (S/cm) at a temperature of 25° C.

According to X-ray diffraction analysis with respect to the protective layer according to an exemplary embodiment, the protective layer has peaks at diffraction angles 2-theta (2θ) of about 12.5° to about 27.5° with a full width at half maximum of about 3° to about 7°. When the full width at half maximum of the peaks is within the range above, the first polymer in the protective layer may have optimized crystallizability and amorphous properties.

The poly(vinyl alcohol) blend may include polyvinyl alcohol and a second polymer that is highly miscible with polyvinyl alcohol and is less soluble or insoluble in a carbonate-based organic solvent.

The second polymer may include, for example, at least one selected from an acryl resin, a methacryl resin, and poly(acrylonitrile). As used herein, "acryl" and "methacryl" includes respectively, acrylate (H2C=CHC(=O)OR) and methacrylate (H2C=C(CH3)C(=O)OR groups wherein R can be any hydrocarbyl group, for example a hydrocarbyl group having 1 to 20 carbon atoms and optionally one or more heteroatoms selected from N, P, S, and O. In some embodiments, the second polymer may include, for example, at least one selected from poly(methyl methacrylate), poly(methyl acrylate), poly(ethyl methacrylate), poly(ethyl acrylate), poly(propyl methacrylate), poly(propyl acrylate), poly(butyl acrylate), poly(butyl methacrylate), poly(pentyl methacrylate), poly(pentyl acrylate), poly(cyclohexyl methacrylate), poly(cyclohexyl acrylate), poly(hexyl methacrylate), poly(hexyl acrylate), poly(glycidyl acrylate), poly(glycidyl methacrylate), and poly(acrylonitrile).

An amount of the second polymer in the poly(vinyl alcohol) blend may be in a range of about 0.1 part by weight to about 100 parts by weight, for example, about 10 parts by weight to about 50 parts by weight, or for example, about 10 parts by weight to about 30 parts by weight, based on 100 parts by weight of the first polymer.

In the protective layer according to an embodiment, the PVA may include a combination of a high molecular weight PVA and a low molecular weight PVA.

Here, the high molecular weight PVA may have a weight-average molecular weight in a range of about 140,000 Da to about 200,000 Da, and the low molecular weight PVA may have a weight-average molecular weight in a range of about 30,000 Da to about 80,000 Da. A mixing weight ratio of the high molecular weight PVA to the low molecular weight PVA may be in a range of about 1:99 to about 99:1, for example, about 20:80 to about 80:20, or for example, about 4:6 to about 6:4. When the high molecular weight PVA and the low molecular weight PVA are used at the mixing weight ratio as described above, improved mechanical strength, such as tensile strength of the protective layer, may be obtained.

The protective layer disposed on the negative electrode for the lithium metal battery may further include a lithium salt. An amount of the lithium salt in the protective layer may be in a range of about 30 parts by weight to about 200 parts by weight, for example, about 50 parts by weight to about 150 parts by weight, based on 100 parts by weight of the first polymer. In addition, a molar ratio of hydroxyl groups of the PVA to lithium may be adjusted to be about 2:1 to about 20:1, for example, about 2.6:1 to about 6:1. When the amount of the lithium salt and the molar ratio of the hydroxyl groups to lithium are within the ranges above, the protective layer may have excellent ion conductivity, as well as good mechanical properties, thereby suppressing the growth of lithium dendrites on the surface of the lithium negative electrode. As such, when the dendritic growth is suppressed, the lithium metal battery may prevent degradation of battery lifespan and stability.

Examples of the lithium salt include at least one selected from LiSCN, LiN(CN)$_2$, LiClO$_4$, LiBF$_4$, LiAsF$_6$, LiPF$_6$, LiCF$_3$SO$_3$, Li(FSO$_2$)$_2$N, Li(CF$_3$SO$_2$)$_3$C, LiN(SO$_2$C$_2$F$_5$)$_2$, LiN(SO$_2$CF$_3$)$_2$, LiSbF$_6$, LiPF$_3$(CF$_2$CF$_3$)$_3$, LiPF$_3$(C$_2$F$_5$)$_3$, LiPF$_3$(CF$_3$)$_3$, LiB(C$_2$O$_4$)$_2$ LiCl, and LiI.

The protective layer may be subjected to a surface analysis method, such as X-ray photoelectron spectroscopy (XPS) and Fourier transform infrared spectroscopy (FT-IR), and to a chemical analysis method, such as nuclear magnetic resonance (NMR) and differential scanning calorimetry (DSC). These methods may be used to determine the presence of the first polymer and the second polymer.

An elongation of the protective layer may be, for example, greater than or equal to about 100%, and for example, greater than or equal to about 150%, and for example, in a range of about 200% to about 300%, at a temperature of 25° C.

An elongation of the protective layer further including the lithium salt may be, for example, greater than or equal to about 50%, and for example, greater than or equal to about 100%, and for example, greater than or equal to about 500%, and for example, in a range of about 700% to about 1,000%, at a temperature of 25° C. The protective layer having an elongation within the range above may also have excellent ductility and durability as determined by volumetric changes in the lithium metal during charging and discharging of the lithium battery, thereby contributing to suppressing the formation of lithium dendrites.

In an exemplary embodiment, at a temperature of about 25° C. an interfacial resistance (Ri) of the electrolyte with respect to a first polymer coated lithium metal may be at least about 10% or smaller than the interfacial resistance of the electrolyte with respect to a bare lithium metal alone as determined by impedance measurements using a Nyquist plot.

In another exemplary embodiment, at a temperature of about 25° C., an interfacial resistance Ri of the protective layer (having an amorphous structure with respect to a bare lithium metal may be at least about 5% or smaller, for example, at least about 10% or smaller, than the interfacial resistance of a protective layer having a crystal structure on a bare lithium metal.

A thickness of the protective layer may be in a range of about 1 micrometer (μm) to about 20 μm, for example, about 1 μm to about 10 μm, or about 1 μm to about 5 μm. When the thickness of the protective layer is within the range above, the protective layer may maintain its excellent mechanical properties and have a small interfacial resistance Ri.

The protective layer may include at least one selected from an inorganic particle, an ionic liquid, a polymer ionic liquid, and an oligomer. For example, the inorganic particle may include at least one selected from SiO$_2$, TiO$_2$, ZnO, Al$_2$O$_3$, BaTiO$_3$, graphene oxide, graphite oxide, carbon nanotube, Fe$_2$O$_3$, CuO, cage-structured silsesquioxane, and a metal-organic framework (MOF).

The cage-structured silsesquioxane may be, for example, a polyhedral oligomeric silsesquioxane (POSS). The number of silicon atoms in the POSS may be about 8 or less, for example, about 6 to about 8. The cage-structured silsesquioxane may include a compound represented by Formula 1:

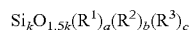

Si$_k$O$_{1.5k}$(R$^1$)$_a$(R$^2$)$_b$(R$^3$)$_c$     Formula 1

In Formula 1, R$^1$, R$^2$, and R$^3$ may each be independently a hydrogen, a substituted or unsubstituted C$_1$-C$_{30}$ alkyl group, a substituted or unsubstituted C$_1$-C$_{30}$ alkoxy group, a substituted or unsubstituted C$_2$-C$_{30}$ alkenyl group, a substituted or unsubstituted C$_2$-C$_{30}$ alkynyl group, a substituted or unsubstituted C$_6$-C$_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

In Formula 1, k=a+b+c and 6≤k≤20.

The cage-structured silsesquioxane may include a compound represented by Formula 2 or a compound represented by Formula 3:

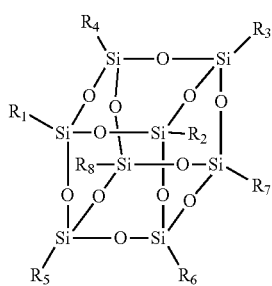

Formula 2

In Formula 2, $R_1$ to $R_8$ may each be independently a hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

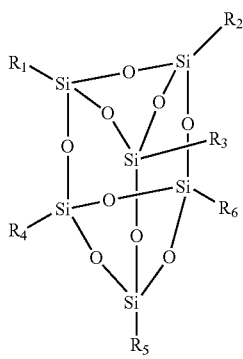

Formula 3

In Formula 3, $R_1$ to $R_6$ may each be independently a hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

In an exemplary embodiment, $R_1$ to $R_8$ in the Formula 2 and $R_1$ to $R_6$ in the Formula 3 may be isobutyl groups. For example, the cage-structured silsesquioxane may be octaisobutyl-t8-silsesquioxane.

An amount of the inorganic particles in the protective layer may be in a range of about 10 parts by weight to about 200 parts by weight, for example, about 50 parts by weight to about 100 parts by weight, based on 100 parts by weight of the first polymer. When the amount of the inorganic particles is within these ranges, the protective layer may have excellent mechanical properties and may effectively suppress the dendritic formation on the lithium negative electrode surface.

The MOF may be a porous crystalline compound in which a Group 2 to Group 15 element ion or a Group 2 to Group 15 element ionic cluster is chemically bonded with an organic ligand.

The organic ligand refers to an organic group that may form a chemical bond with the metal ion or metal ionic cluster. The bond may be a coordinate bond, an ionic bond, or a covalent bond. For example, an organic group having at least two binding sites for such metal ions may form a stable structure through binding with the metal ions.

The Group 2 to Group 15 element ion may be at least one selected from cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), and bismuth (Bi). The organic ligand may be a group derived from at least one selected from an aromatic dicarboxylic acid, an aromatic tricarboxylic acid, an imidazole-based compound, a tetrazole-based compound, 1,2,3-triazole, 1,2,4-triazole, pyrazole, an aromatic sulfonic acid, an aromatic phosphonic acid, an aromatic sulfinic acid, an aromatic phosphinic acid, a bipyridine, and a compound having at least one functional group selected from an amino group, an imino group, an amide group, a dithiocarboxylic acid group (—$CS_2H$), a dithiocarboxylic acid anion group (—$CS_2^-$), a pyridine group, and a pyrazine group.

The aromatic dicarboxylic acid or the aromatic tricarboxylic acid may be at least one selected from benzene dicarboxylic acid, benzene tricarboxylic acid, biphenyl dicarboxylic acid, and triphenyl-dicarboxylic acid.

The organic ligand may be a group derived from any one of a compounds represented by Formula 4:

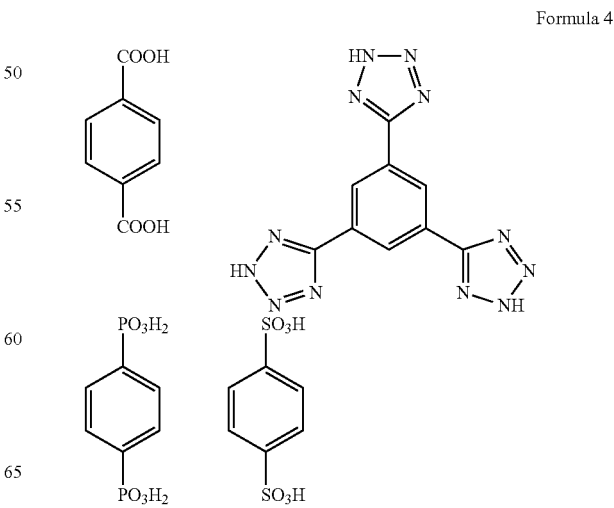

Formula 4

-continued

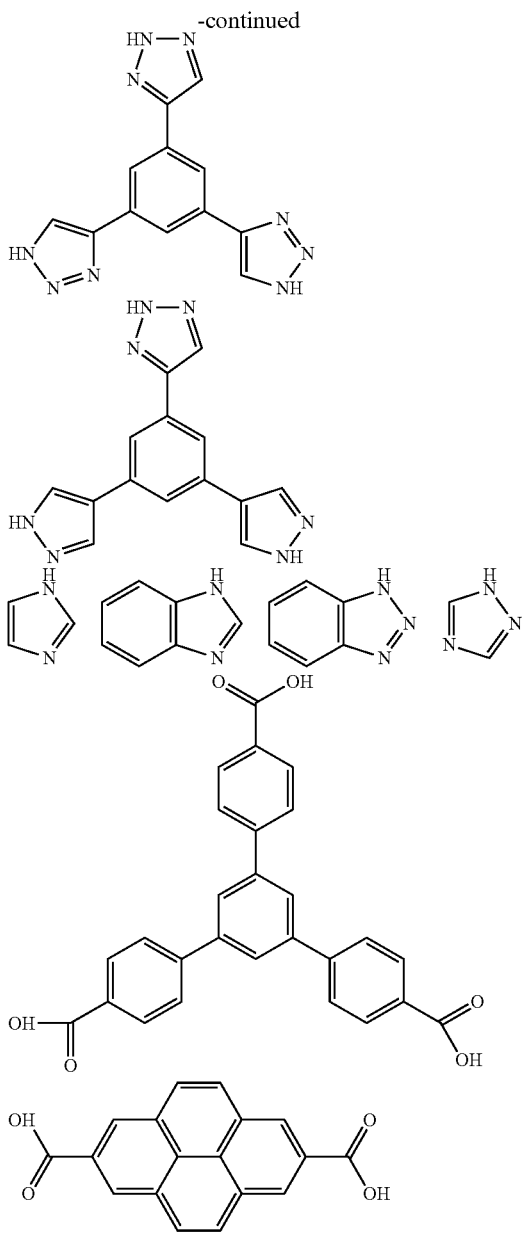

The MOF may be, for example, at least one selected from $Ti_8O_8(OH)_4[O_2C—C_6H_4—CO_2]_6$, Cu (bpy)$(H_2O)_2(BF_4)_2$ (bpy){bpy=4, 4'-bipyridine}, $Zn_4O(O_2C—C_6H_4—CO_2)_3$ (Zn-terephthalic acid-MOF, Zn-MOF), and Al(OH){$O_2C—C_6H_4—CO_2$}.

When the protective layer according to an exemplary embodiment includes an inorganic particle, the protective layer may have further improved mechanical properties. The inorganic particles may have an average particle diameter of about 100 nanometers (nm) or less, for example, about 1 nm to about 100 nm, for example, about 5 nm to about 70 nm. For example, the inorganic particles may have an average particle diameter in a range of about 30 nm to about 70 nm. When the average particle diameter of the inorganic particles is within these ranges, it may be possible to prepare the protective layer having improved film formability and improved mechanical properties.

The ionic liquid refers to a salt in a liquid state at room temperature or a fused salt at room temperature that consists only of ions having a melting point equal to or below room temperature. The ionic liquid may be at a compound including at least one cation and at least one anion. The at least one cation may be selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and the at least one anion may be selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

The ionic liquid may include a cation represented by Formula 5:

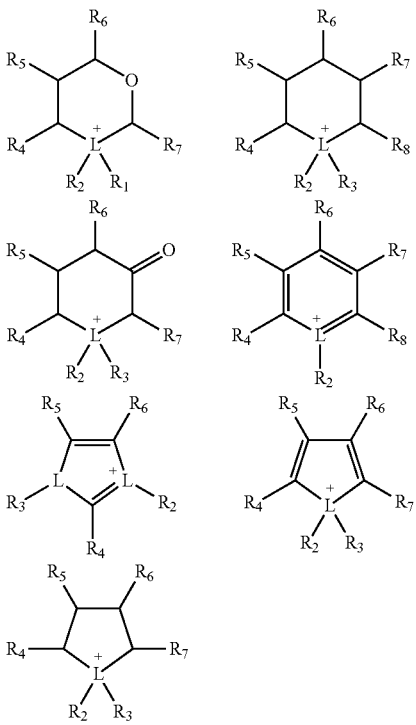

Formula 5

In Formula 5, L may be N or P, and $R_2$ to $R_8$ may each be independently a hydrogen, a substituted or unsubstituted C1-C30 alkyl group, a substituted or unsubstituted C1-C30 alkoxy group, a substituted or unsubstituted C6-C30 aryl group, a substituted or unsubstituted C6-C30 aryloxy group, a substituted or unsubstituted C3-C30 heteroaryl group, a substituted or unsubstituted C3-C30 heteroaryloxy group, a substituted or unsubstituted C4-C30 cycloalkyl group, or a substituted or unsubstituted C3-C30 heterocycloalkyl group.

An amount of the ionic liquid in the protective layer may be in a range of about 5 parts by weight to about 40 parts by weight, for example, about 10 parts by weight to about 20 parts by weight, based on 100 parts by weight of the first polymer. When the amount of the ionic liquid is within these ranges, a protective layer with improved mechanical properties may be obtained.

The ionic liquid may be, for example, at least one selected from N-methyl-N-propylpyrrolidinium bis(trifluoromethanesulfonyl)imide, N-butyl-N-methylpyrrolidinium bis(trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

When the protective layer includes an ionic liquid (IL) and a lithium salt (Li), a molar ratio (IL/Li) of the ionic liquid to lithium ions may be in a range of about 0.1 to about 2.0, for example, about 0.2 to about 1.8 and about 0.4 to about 1.5. The protective layer having such a molar ratio may have high lithium ion mobility, high ionic conductivity, and improved mechanical properties, thereby effectively suppressing the growth of lithium dendrites on a surface of the negative electrode.

The oligomer may be include the monomer ethylene oxide having lithium ionic conductivity, and the oligomer may have a weight average molecular weight in a range of about 200 Daltons to about 2,000 Daltons.

The oligomer may include at least one selected from poly(ethylene glycol) dimethyl ether and poly(ethylene glycol) diethyl ether.

An amount of the oligomer in the protective layer may be in a range of about 5 parts by weight to about 50 parts by weight, for example, about 10 parts by weight to about 30 parts by weight, based on 100 parts by weight of the first polymer. When the oligomer is included in the protective layer, the protective layer may have improved film formability, improved mechanical properties, and high ionic conductivity.

The protective layer may be formed as a free-standing membrane, and may be used as a protective layer for a lithium metal in a lithium metal battery, such as a lithium ion battery and a lithium polymer battery.

The protective layer may be suitable for use with, for example, a high-voltage lithium battery. Here, high-voltage refers to a voltage of at least 4.0 volts (V), for example, about 4.0 to about 5.5 V and about 4.5 to about 5.0 V.

The lithium metal battery may further include at least one selected from a solid electrolyte, a gel electrolyte, and a polymer ionic liquid.

When the lithium battery includes at least one selected from a solid electrolyte, a gel electrolyte, and a polymer ionic liquid, the lithium metal battery may have ionic conductivity and mechanical properties which is further improved.

The lithium metal battery may further include a separator.

In another exemplary embodiment, the lithium metal battery may include i) liquid electrolyte; ii) at least one selected from a solid electrolyte, a gel electrolyte, and a polymer ionic liquid, and iii) a separator.

The liquid electrolyte according to an exemplary embodiment may include at least one selected from ethylene carbonate, propylene carbonate, dimethyl carbonate, diethyl carbonate, ethylmethyl carbonate, fluoroethylene carbonate, dimethoxyethane, diethoxyethane, diethylene glycol dimethylether, dipropylene glycol dimethyl ether, tetraethylene glycol dimethyl ether, polyethylene glycol dimethylether, succinonitrile, sulfolane, dimethyl sulfone, ethylmethyl sulfone, diethyl sulfone, adiponitrile, tetrahydrofuran, N-methylpyrrolidone, acetonitrile, benzonitrile, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxy ethane, dichloro ethane, chlorobenzene, nitrobenzene, diethylene glycol, dimethyl ether, and 1,1,2,2-tetrafluoroethyl 2,2,3,3-tetrafluoropropyl ether.

The lithium metal battery according to an exemplary embodiment may include a stacked structure of i) the lithium negative electrode, ii) the protective layer including at least one first polymer selected from poly(vinyl alcohol) and poly(vinyl alcohol) blend. iii) the separator and the liquid electrolyte, and iv) the positive electrode, which are sequentially stacked, for example, in the stated order.

The liquid electrolyte may further include at least one selected from an organic solvent, an ionic liquid, and a lithium salt.

The organic solvent may be any solvent suitable for a lithium battery in the art, and non-limiting examples of the organic solvent are a carbonate compound, a glyme compound, and a dioxolane compound.

The carbonate compound may include at least one selected from ethylene carbonate, propylene carbonate, dimethyl carbonate, fluoroethylene carbonate, diethyl carbonate, and ethylmethyl carbonate.

The glyme-based compound may be, for example, at least one selected from poly(ethylene glycol) dimethyl ether (PEGDME, polyglyme), tetra(ethylene glycol) dimethyl ether (TEGDME, tetraglyme), tri(ethylene glycol) dimethyl ether (triglyme), poly(ethylene glycol) dilaurate (PEGDL), poly(ethylene glycol) monoacrylate (PEGMA), and poly(ethylene glycol) diacrylate (PEGDA).

The dioxolane-based compound may be, for example, at least one selected from 1, 3-dioxolane, 4,5-diethyl-1,3-dioxolane, 4,5-dimethyl-1,3-dioxolane, 4-methyl-1,3-dioxolane, and 4-ethyl-1,3-dioxolane.

The organic solvent may be, for example, at least one selected from 2,2-di methoxy-2-phenylacetophenone, dimethoxyethane, diethoxyethane, tetrahydrofuran, and gamma-butyrolactone.

The polymer ionic liquid may be, for example, at least one selected from a polymerization product of ionic liquid monomers (e.g. polymer ionic liquid) and a polymeric compound. The polymer ionic liquid is highly dissoluble in an organic solvent, and thus may further improve the ionic conductivity of the electrolyte when included in the liquid electrolyte.

In preparing a polymer ionic liquid by polymerization of ionic liquid monomers, the resulting product from the polymerization reaction may be washed and dried, followed by an anionic substitution reaction to obtain appropriate anions that may improve solubility of the polymerization product in an organic solvent. The polymer ionic liquid may include a functional group polymerizable such as at least one of a vinyl group, an allyl group, an acrylate group, and a methacrylate group, and may include at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and at least one of the above-listed anions.

The ionic liquid monomers may be, for example, at least one selected from 1-vinyl-3-ethylimidazolium bromide, a compound represented by Formula 8, and a compound represented by Formula 9:

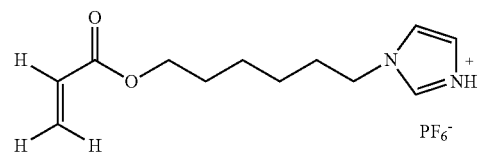

Formula 8

-continued

Formula 9

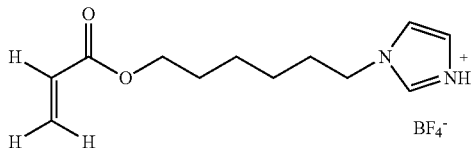

The polymer ionic liquid according to an exemplary embodiment may include a repeating unit including at least one cation and at least one anion. The at least one cation may be selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation, and the at least one anion may be selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

The polymer ionic liquid may be, for example, at least one of a compound represented by Formula 10 and a compound represented by Formula 11.

Formula 10

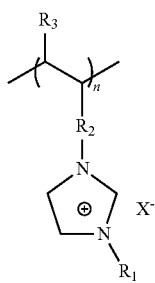

In Formula 10, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group. In Formula 10, $R_2$ may be a chemical bond, a C1-C30 alkylene group, a C6-C30 arylene group, a C2-C30 heteroarylene group, o a C4-C30 carbocyclic ring divalent group, $X^-$ may be an anion in the ionic liquid, and n may be from 500 to 2,800.

Formula 11

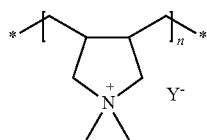

In Formula 11, $Y^-$ may be the same anion as $X^-$ as defined in Formula 10, and n may be from 500 to 2,800.

In Formula 11, Y may be, for example, bis(trifluoromethanesulfonyl)imide (TFSI), $BF_4$, or $CF_3SO_3$.

The polymer ionic liquid may include, for example, a cation selected from at least one of poly(1-vinyl-3-alkylimidazolium), poly(1-allyl-3-alkylimidazolium), and poly(1-(methacryloyloxy)-3-alkylimidazolium); and an anion selected from at least one of ($CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

The compound of Formula 11 may be polydiallyldimethylammonium bis(trifluoromethanesulfonyl)imide.

In another exemplary embodiment, the polymer ionic liquid may include at least one of a low-molecular weight polymer, a thermally stable ionic liquid, and a lithium salt. The low-molecular weight polymer may include an ethylene oxide chain. The low-molecular weight polymer may be a glyme (e.g. a glycol ether), and examples of the glyme are polyethyleneglycol dimethylether (polyglyme), tetraethyleneglycol dimethyl ether (tetraglyme), and triethyleneglycol dimethylether (triglyme).

The low-molecular weight polymer may have a weight average molecular weight in a range of about 75 Da to about 2,000 Da, for example, about 250 Da to about 500 Da. The thermally stable ionic liquid may be defined the same as described above. The lithium salt may be also defined be the same as the lithium salts described above.

Any suitable electrolyte having a gel form in the art may be used as the gel electrolyte.

The gel electrolyte may include, for example, a polymer and a polymer ionic liquid.

The polymer may be, for example, a solid graft (block) copolymer electrolyte.

The solid electrolyte may be an organic solid electrolyte or an inorganic solid electrolyte.

The organic solid electrolyte may be, for example, at least one of a polyethylene derivative, a polyethylene oxide derivative, a polypropylene oxide derivative, a phosphoric acid ester polymer, polyvinyl alcohol, polyvinylidene fluoride, and a polymer including an ionic dissociative group.

The inorganic solid electrolyte may be, for example, at least one of $Cu_3N$, $Li_3N$, LiPON, $Li_3PO_4.Li_2S.SiS_2$, $Li_2S.GeS_2.Ga_2S_3$, $(Na,Li)_{1+x}Ti_{2-x}Al_x(PO_4)_3$ (wherein $0.1 \leq x \leq 0.9$), $Li_{1+x}Hf_{2-x}Al_x(PO_4)_3$ (wherein $0.1 \leq x \leq 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, $Li_{0.3}La_{0.5}TiO_3$, $Na_5MSi_4O_{12}$ (wherein M is a rare-earth element such as Nd, Gd, and Dy), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $0 \leq x \leq 0.8$ and $0 \leq y \leq 1.0$, and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \leq 0.4$ and $0 < y \leq 0.6$ and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein $0 < x < 3$ and A is Zn).

Hereinafter, a method of preparing the negative electrode for the lithium metal battery according to an exemplary embodiment will be described.

First, a composition for forming the protective layer is prepared by mixing an organic solvent and a first polymer selected from at least one of a PVA and a PVA blend.

The organic solvent may be at least one of tetrahydrofuran, N-methylpyrrolidone, acetonitrile, benzonitrile, 2-methytetrahydrofuran, γ-butyrolactone, dioxolane, 4-methyldioxolane, N,N-dimethyl formamide, N,N-dimethyl acetamide, dimethyl sulfoxide, dioxane, 1,2-dimethoxyethane, sulfolane, dichloroethane, chlorobenzene, nitrobenzene, diethylene glycol, and dimethyl ether. An amount of the organic solvent may be in a range of about 100 parts by weight to about 10,000 parts by weight based on 100 parts by weight of the first polymer.

In the process of preparing the composition for forming the protective layer, the organic solvent and the first polymer selected from at least one of a PVA and a PVA blend are mixed at a temperature in a range of about 25° C. to about 100° C., for example, about 70° C. to about 90° C.

At least one of an ionic liquid, a polymer ionic liquid, an inorganic particle, a lithium salt, and an oligomer may be further added to the composition for forming the protective layer.

A protective layer in a form of a membrane may be prepared using the composition for forming the protective layer. For example, the protective layer may be formed by coating at least a portion of the negative electrode with the composition for forming the protective layer, and then, drying the composition on the negative electrode, so as to form a protective layer disposed on the negative electrode. Here, the drying of the composition on the negative electrode is performed at a temperature of less than or equal to about 60° C., for example, a temperature of less than or equal to about 40° C., or at a temperature in a range of about 25° C. to about 40° C. When the drying temperature is within the ranges above, deformation of the lithium negative electrode may be suppressed and excellent mechanical properties of the lithium negative electrode may be obtained.

The protective layer may be directly coated and dried on the lithium negative electrode as described above. Alternatively, the protective layer may be separately coated and dried on a separate substrate for later use.

The dried negative electrode may be further subjected to a vacuum drying process at a temperature of less than or equal to about 60° C., for example, a temperature of less than or equal to about 40° C. or a temperature in a range of about 25° C. to about 40° C. Accordingly, by vacuum-drying the negative electrode, the amount of the organic solvent remaining in the protective layer may be controlled within a desired range.

According to an exemplary embodiment, the amount of the organic solvent remaining in the protective layer may be less than or equal to about 10 weight %, for example, about 0.01 weight % to about 10 weight %, based on 100 parts by weight of a total weight of the protective layer.

A non-limiting example of the organic solvent is dimethylsulfoxide (DMSO). When the amount of the organic solvent included in the protective layer is within the range above, a lithium salt may be uniformly dispersed in the protective layer, thereby exhibiting excellent mechanical properties and ion conductivity. The amount of the organic solvent, such as DMSO, included in the protective layer may be determined by thermogravimetric analysis.

Any coating method suitable to form a protective layer in the art may be used to coat the composition for forming the protective layer on the negative electrode. For example, coating methods, such as spin coating, roll coating, curtain coating, extruding, casting, screen printing, inkjet printing, and a method using a doctor blade, may be used.

The protective layer may be electrochemically stable with respect to lithium in a voltage range of about 0 V to about 5.5 V, for example, about 0 V to about 5.0 V or about 0 V to about 4.0 V. The protective layer according to an exemplary embodiment may be electrochemically stable across a wide voltage window, and thus may be applicable to an electrochemical device operating at a high voltage.

In the protective layer, a current density resulting from side reaction which occur with respect to lithium, other than intercalation/deintercalation of lithium ions, may be less than or equal to about 0.05 milliampere per square centimeter ($mA/cm^2$), for example, less than or equal to about 0.02 $mA/cm^2$, or less than or equal to about 0.01 $mA/cm^2$, at a voltage of 0 V.

In addition, in the protective layer, a current density resulting from an oxidation reaction which occurs with respect to lithium may be less than or equal to about 0.05 $mA/cm^2$, for example, less than or equal to about 0.04 $mA/cm^2$ or less than or equal to about 0.02 $mA/cm^2$, at a voltage of about 5.0 V.

The negative electrode for the lithium metal battery may be used at high voltages. For example, the negative electrode may be used at a voltage of greater than or equal to about 4.0 V, for example, a voltage in a range of about 4.0 V to about 5.5 V.

The lithium metal battery is not limited to a particular type, and thus may be a lithium ion battery, a lithium ion polymer battery, a lithium sulfur battery, or a lithium air battery.

The lithium metal battery has excellent characteristics in terms of a voltage, a capacity, and an energy density, and thus may be applicable in various devices, such as a mobile phone, a notebook PC, a storage battery for a power plant (for example, wind or solar power), an electric vehicle, an uninterruptible power supply (UPS), and a household battery.

Figure 2:
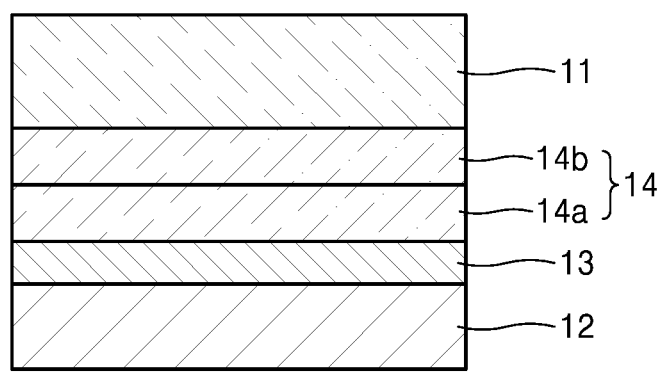

FIGS. 1 and 2 are schematic views each illustrating a structure of the lithium metal battery including the negative electrode according to exemplary embodiments.

As shown in FIG. 1, the lithium metal battery has a structure including a positive electrode 11, a negative electrode 12, and a protective layer 13 between the positive electrode 11 and the negative electrode 12. In addition, a liquid electrolyte 14a is disposed between the protective layer 13 and the positive electrode 11. The liquid electrolyte 14a may include a composition that is identical to or different from a composition of a liquid electrolyte that may be included in the protective layer 13.

When the protective layer 13 is disposed on at least a portion of the negative electrode 12, the surface of the negative electrode is mechanically and electrochemically stabilized. Accordingly, during the charging and discharging of the lithium metal battery, the dendrite formation and growth on the surface of the negative electrode may be suppressed. Furthermore, the increase in interfacial resistance between the negative electrode and the electrolyte which may occur over time is eased off, thereby improving interfacial stability therebetween. Thus, the lithium metal battery may have improved cycle characteristics.

The protective layer 13 may serve as a protective layer for the surface of the negative electrode 12 when disposed on a part of the surface of the negative electrode 12 or on the entire surface of the negative electrode 12. For example, the protective layer 13 may be disposed on the entire surface of the negative electrode. For example, the protective layer 13 may prevent the negative electrode 12 from directly contacting an electrolyte having high reactivity to the surface of the negative electrode 12. Accordingly, the protected negative electrode may exhibit improved stability.

As shown in FIG. 2, in regard to the liquid electrolyte 14a of FIG. 1, the lithium metal battery has a two-layered structure including a liquid electrolyte 14a and a separator 14b that are sequentially stacked on the protective layer 13. Here, the liquid electrolyte 14a may be disposed to be in direct contact with the protective layer 13. A combination of the liquid electrolyte 14a and the separator 14b may be referred to as an electrolyte 14.

The separator 14b may be a single layer of polyethylene, polypropylene, and polyvinylidene fluoride, or a multilayer including two or more layers of polyethylene, polypropylene, and polyvinylidene fluoride. For example, the separator 14b may have a combined multi-layer structure, such as two-layered separator including polyethylene/polypropylene, a three-layered separator including polyethylene/polypropylene/polyethylene, or a three-layered separator including polypropylene/polyethylene/polypropylene.

The lithium metal battery may further include, in addition to the above-described liquid electrolyte and the separator, at least one selected from a polymer ionic liquid, a solid electrolyte, and a gel electrolyte.

In FIGS. 1 and 2, the positive electrode 11 may be a porous positive electrode. The porous positive electrode may be positive electrode which includes pores or any positive electrode that allows permeation of a liquid electrolyte thereinto by capillary action.

For example, a porous positive electrode may be a positive electrode obtained by coating and drying a composition for forming a positive electrode active material, wherein the composition includes a positive electrode active material, a conducting agent, a binder, and a solvent. The positive electrode obtained therefrom may include pores dispersed among positive electrode active material particles. In this regard, a liquid electrolyte may be impregnated in the porous positive electrode.

According to another exemplary embodiment, the positive electrode 11 may include an electrolyte selected from at least one of a liquid electrolyte, a gel electrolyte, and a solid electrolyte. The liquid electrolyte, the gel electrolyte, and the solid electrolyte may be any material in the art suitable for use as an electrolyte for a lithium metal battery that does not react with a positive electrode active material during charging and discharging of a battery so that the positive electrode active material is prevented from deterioration.

In FIGS. 1 and 2, a lithium metal thin-film is used as the negative electrode. The lithium metal thin-film may have a thickness of less than or equal to about 100 µm.

The lithium metal battery may be, for example, a lithium ion battery or a lithium sulfur battery.

The protective layer 13 may be capable of performing a protective function regardless of the inclusion of the organic solvent, such as a carbonate solvent, and accordingly, may have excellent mechanical properties. In addition, the protective layer 13 is not dissolved by the organic solvent, such as an ether solvent and a carbonate solvent, or the ionic liquid. In addition, due to the stacking of the protective layer 13 on the negative electrode, the growth of dendrites on the surface of the negative electrode after charging and discharging may be suppressed. Without being limited by theory, it is believed that this is due to good interfacial characteristics between the protective layer and the lithium metal. Furthermore, short-circuiting of a lithium battery caused by a crack in the protective layer may be also suppressed in an efficient manner. In addition, the protective layer 13 may be stable with respect to the liquid electrolyte.

Each of the components of the lithium metal battery and a method of manufacturing the lithium metal battery including such components are described as follows.

The positive electrode active material used to form the positive electrode may include at least one selected from lithium cobalt oxide, lithium nickel cobalt manganese oxide, lithium nickel cobalt aluminum oxide, lithium iron phosphate, and lithium manganese oxide, but is not limited thereto. Any material suitable for use as the positive electrode active material in the art may be used.

For example, the positive electrode active material may a compound represented by at least one of the following formulae $Li_aA_{1-b}B_bD_2$ (wherein, $0.90 \leq a \leq 1.8$ and $0 \leq b \leq 0.5$), $Li_aE_{1-b}B_bO_{2-c}D_c$ (wherein, $0.90 \leq a \leq 1.8$, $0 \leq b \leq 0.5$, and $0 \leq c \leq 0.05$), $LiE_{2-b}B_bO_{4-c}D_c$ (wherein, $0 \leq b \leq 0.5$ and $0 \leq c \leq 0.05$), $Li_aNi_{1-b-c}Co_bB_cD_\alpha$ (wherein, $0.90 \leq a \leq 1.8$, $0 \leq b \leq 0.5$, $0 \leq c \leq 0.05$, and $0 < \alpha \leq 2$), $Li_aNi_{1-b-c}Co_bB_cO_{2-\alpha}F_\alpha$ (wherein, $0.90 \leq a \leq 1.8$, $0 \leq b \leq 0.5$, $0 \leq c \leq 0.05$, and $0 < \alpha < 2$); $Li_aNi_{1-b-c}Mn_bB_cD_\alpha$ (wherein, $0.90 \leq a \leq 1.8$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (wherein, $0.90 \leq a \leq 1.8$, $0 \leq b \leq 0.5$, $0 \leq c \leq 0.05$, and $0 < \alpha < 2$), $Li_aNi_bE_cG_dO_2$ (wherein, $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (wherein, $0.90 \leq a \leq 1.8$, $0 \leq b \leq 0.9$, $0 \leq c \leq 0.5$, $0 \leq d \leq 0.5$, and $0.001 \leq e \leq 0.1$), $Li_aNiG_bO_2$ (wherein, $0.90 \leq a \leq 1.8$ and $0.001 \leq b \leq 0.1$), $Li_aCoG_bO_2$ (wherein, $0.90 \leq a \leq 1.8$ and $0.001 \leq b \leq 0.1$), $Li_aMnG_bO_2$ (wherein, $0.90 \leq a \leq 1.8$ and $0.001 \leq b \leq 0.1$), $Li_aMn_2G_bO_4$ (wherein, $0.90 \leq a \leq 1.8$ and $0.001 \leq b \leq 0.1$), $QO_2$, $QS_2$; $LiQS_2$; $V_2O_5$, $LiV_2O_5$, $LiIO_2$, $NiVO_4$, $Li_{(3-f)}J_2(PO_4)_3 (0 \leq f \leq 2)$, $Li_{(3-f)}Fe_2(PO_4)_3 (0 \leq f \leq 2)$, or $LiFePO_4$.

In the formulae above, A may be a least one of Ni, Co, and Mn; B may be at least one of Al, Ni, Co, Mn, Cr, Fe, Mg, Sr, V, and a rare-earth element; D may be at least one of O, F, S, and E may be at least one of Co and Mn; F may be at least one of F, S, and G may be at least one of Al, Cr, Mn, Fe, Mg, La, Ce, Sr, and V; Q may be at least one of Ti, Mo, and Mn; I may be at least one of Cr, V, Fe, Sc, and Y; and J may be at least one of V, Cr, Mn, Co, Ni, and Cu.

The positive electrode active material may be, for example, at least one of a compound represented by Formula 12, a compound represented by Formula 13, and a compound represented by Formula 14.

$$Li_aNi_bCo_cMn_dO_2 \qquad \text{Formula 12}$$

In Formula 12, $0.90 \leq a \leq 1.8$, $0 \leq b \leq 0.9$, $0 \leq c \leq 0.5$, and $0 \leq d \leq 0.5$.

$$Li_2MnO_3 \qquad \text{Formula 13}$$

$$LiMO_2 \qquad \text{Formula 14}$$

In Formula 14, M may be Mn, Fe, Co, or Ni.

A positive electrode is prepared as follows.

A positive electrode active material, a binder, and a solvent are mixed to prepare a composition for forming a positive electrode active material.

A conducting agent may be further added to the composition for forming the positive electrode active material.

The composition may be directly coated on a metal current collector and dried to prepare a positive electrode plate. Alternatively, the composition may be cast on a separate support, and then, a film exfoliated from the support may be laminated on a metal current collector to prepare the positive electrode plate.

The binder is a composition that capable of binding with the positive electrode active material and the conductive material, and is also capable of binding with a current collector. An amount of the binder is from about 1 part by weight to about 50 parts by weight based on 100 parts by weight based on the total weight of the positive electrode active material. Examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene butylene rubber, fluorine rubber, and various copolymers thereof. A content of the binder is from about 2 parts by weight to about 5 parts by weight based on 100 parts by weight of the total weight of the positive electrode active material. When a content of the binder is within this range, a binding force of the active material layer with respect to the current collector is satisfactory.

The conductive agent may be any material which is conductive and does not cause a chemical change in the battery. Examples of the conductive agent include graphite, such as natural graphite or artificial graphite; carbon blacks, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whiskers, such as zinc oxide whiskers or potassium titanate whiskers; a conductive metal oxide, such as a titanium oxide; and a conductive polymer, such as a polyphenylene derivative.

An amount of the conducting agent may be from about 1 part by weight to about 10 parts by weight, for example, from about 1 part by weight to about 5 parts by weight, based on 100 parts by weight of the total weight of the positive electrode active material. When a content of the conducting agent is within this range, the finally obtained positive electrode may have excellent conductivity characteristics.

Examples of the solvent include N-methylpyrrolidone.

A content of the solvent is from about 100 parts by weight to about 2000 parts by weight based on 100 parts by weight of the positive electrode active material. When a content of the solvent is within this range, a process for forming the active material layer may be easily carried out.

In some embodiments, a plasticizer may be further added to the composition for forming the positive electrode active material and/or the composition for forming the negative electrode active material, so as to form pores in an electrode plate.

The amounts of the positive electrode active material, the conducting agent, the binder, and the solvent may be those levels that are generally used in lithium metal batteries in the art. In some embodiments, at least one of the conducting agent, the binder, and the solvent may not be included depending upon the desired use and structure of the lithium metal battery.

The negative electrode may be a lithium metal thin-film or lithium alloy thin-film.

The lithium alloy may include lithium and a metal/metalloid alloyable with lithium. For example, the metals/metalloids alloyable with lithium are Si, Sn, Al, Ge, Pb, Bi, Sb, a Si—Y alloy (where Y is an alkali metal, an alkali earth metal, a Group 13 to 16 element, a transition metal, a rare earth element, or a combination thereof except for Si), or a Sn—Y alloy (where Y is an alkali metal, an alkali earth metal, a Group 13 to 16 element, a transition metal, a rare earth element, or a combination thereof except for Sn). For example, Y may be at least one of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, and Po.

According to an exemplary embodiment, the electrolyte may include a liquid electrolyte and a separator.

The separator may be an insulating thin-film having high ion permeability and high mechanical strength. The separator may include pores having a pore diameter in a range of about 0.01 μm to about 10 μm and a thickness in a range of about 5 μm to about 20 μm. Examples of the separator include an olefin-based polymer, such as polypropylene; and a sheet or a non-woven fabric made of glass fiber or polyethylene. When a solid polymer electrolyte is used as the electrolyte, the solid polymer electrolyte may also serve as the separator.

The separator may be, for example, a single layer of polyethylene, polypropylene, or polyvinylidene fluoride, or a multilayer including two or more layers of polyethylene, polypropylene, and polyvinylidene fluoride. For example, the separator may be a combined multilayer, such as two-layered separator including polyethylene/polypropylene, a three-layered separator including polyethylene/polypropylene/polyethylene, or a three-layered separator including polypropylene/polyethylene/polypropylene.

The liquid electrolyte may include at least one selected from an ionic liquid, an organic solvent, and a lithium salt.

Any material suitable for use as an organic solvent in the art may be used herein. Examples of the organic solvent include at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, and dimethyl ether.

Examples of the lithium salt include at least one selected from $LiSCN$, $LiN(CN)_2$, $LiClO_4$, $LiBF_4$, $LiAsF_6$, $LiPF_6$, $LiCF_3SO_3$, $Li(CF_3SO_2)_3C$, $LiN(SO_2CF_3)_2$, $LiN(SO_2CF_2CF_3)_2$, $LiSbF_6$, $LiPF_3(C_2F_6)_3$, $LiPF_3(CF_3)_3$, $LiB(C_2O_4)_2$ $LiCl$, and $LiI$.

In terms of improving charge-discharge characteristics and flame resistance of the liquid electrolyte, at least one of pyridine, triethyl phosphate, triethanolamine, cyclic ether, ethylene diamine, n-glyme, hexamethyl phosphoramide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, and aluminum trichloride may be added to the liquid electrolyte. In terms of providing non-flammable characteristics to the liquid electrolyte, a halogen-containing solvent, such as carbon tetrachloride and ethylene trifluoride, may be further added to the liquid electrolyte.

The lithium metal battery according to an exemplary embodiment may further include at least one selected from the polymer ionic liquid, the polymer electrolyte, and the gel electrolyte as described above.

The lithium metal battery according to an exemplary embodiment may have improved capacity and lifespan characteristics, and thus may be used in a battery cell which is used as a power source for a small device or may be used as a unit battery of a medium to large size battery pack or a battery module including a plurality of cells for use as a power source of a medium-large size device.

Examples of the medium-large size device are electric three- or four-wheeled vehicles (EVs) including hybrid electric vehicles (HEVs) and plug-in hybrid electric vehicles (PHEVs), electric two-wheeled vehicles including electric-bikes (E-bikes) and electric scooters (E-scooter); power tools; power storage devices; and the like, but are not limited thereto.

In the present specification, the "alkyl group" indicates a fully saturated (branched or linear) hydrocarbon.

Non-limiting examples of the "alkyl group" are methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom of the "alkyl group" may be substituted with a halogen atom, a C1-C20 alkyl group substituted with a halogen atom (for example, $CCF_3$, $CHCF_2$, $CH_2F$, or $CCl_3$), a C1-C20 alkoxy group, a C2-C20 alkoxyalkyl group, a hydroxyl group, a nitro group, a cyano group, an amino group, an amidino group, a hydrazine group, a hydrazone group, a carboxyl group and a salt thereof, a sulfonyl group, a sulfamoyl group, a sulfonic acid and a salt thereof, a phosphorus acid group and a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, a C6-C20 heteroaryloxyalkyl group, and a C6-C20 heteroarylalkyl group.

The term "halogen atom" used herein indicates fluorine, bromine, chloride, iodine, and the like.

The term "alkenyl group" used herein indicates a branched or unbranched hydrocarbon group with at least one carbon-carbon double bond. Non-limiting examples of the "alkynyl group" are vinyl, aryl, butenyl, isopropenyl, and isobutenyl. At least one hydrogen atom of the alkenyl group may be substituted with any of the substituents for the alkyl group as described above.

The term "alkynyl group" used herein indicates a branched or unbranched hydrocarbon group with at least one carbon-carbon triple bond. Non-limiting examples of the "alkynyl group" are ethynyl, butynyl, isobutynyl, and propynyl.

At least one hydrogen atom of the "alkynyl group" may be substituted with any of the substituents for the alkyl group as described above.

The term "aryl group" used herein indicates a group in which an aromatic ring is fused to at least one carbocyclic group. Non-limiting examples of the "aryl group" are phenyl, naphthyl, and tetrahydronaphthyl.

In addition, at least one hydrogen atom of the "aryl group" may be substituted with any of the substituents for the alkyl group as described above.

The term "heteroaryl group" used herein indicates a monocyclic or bicyclic aromatic organic group including at least one heteroatom selected from N, O, P, and S, wherein the rest of the cyclic atoms are all carbon. The heteroaryl group may include, for example, one to five heteroatoms, or may include a 5-10 membered ring. In the heteroaryl group, S or N may be oxidized and present in various oxidized forms.

Examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isooxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, 2-pyrazine-2-yl, pyrazine-4-yl, pyrazine-5-yl, 2-pyrimidine-2-yl, 4-pyrimidine-2-yl, or 5-pyrimidin-2-yl.

The term "heteroaryl" used herein indicates a heteroaromatic ring optionally fused to at least one of an aryl group, a cycloaliphatic group, and a heterocyclic group.

The term "carbocyclic group" used herein indicates a saturated or partially unsaturated non-aromatic monocyclic, bicyclic, or tricyclic hydrocarbon group.

The monocyclic hydrocarbon group may be, for example, cyclopentyl, cyclopentenyl, cyclohexyl, or cyclohexenyl. The bicyclic hydrocarbon group may be, for example, bornyl, decahydronaphthyl, bicyclo[2.1.1]hexyl, bicyclo[2.2.1]heptyl, bicyclo[2.2.1]heptenyl, or bicyclo[2.2.2]octyl. In addition, the tricyclic hydrocarbon group may be, for example, adamantyl.

The term "heteroring" as used herein indicates a C5-C20 cyclic hydrocarbon group, for example, a C5-C10 cyclic hydrocarbon group, including at least one heteroatom. Here, the heteroatom may be one of S, N, O, and B.

The terms "alkoxy", "aryloxy", and "heteroaryloxy" used herein indicate 'alkyl', 'aryl', and 'heteroaryl', respectively, each of which is bound to an oxygen atom.

The embodiments of the present invention are described in detail with reference to Examples and Comparative Examples below. However, Examples are provided here for illustrative purpose only, and do not limit the scope of the present invention.

EXAMPLES

Example 1: Preparation of Negative Electrode

A poly(vinyl alcohol) (PVA) (having a weight average molecular weight of about $93.5 \times 10^3$ Daltons and a saponification value of about 99 mol %) was dissolved in DMSO, and the mixed solution was stirred at a temperature of about 90° C. for 2 hours, so as to obtain a 5 wt % PVA solution.

Then, lithium bis(fluorosulfonyl)imide (LiFSI) was added to the PVA solution, so as to obtain a composition for forming a protective layer. Here, the PVA and a lithium salt were mixed at a mixed weight ratio of about 3:2 in the composition, and a ratio of a hydroxyl group of the PVA and lithium of the lithium salt was about 6:1.

The composition for forming the protective layer was diluted about 6-fold with DMSO, and was cast on a lithium metal thin film having a thickness of about 20 μm using a doctor blade. Then, the resulting product was dried in a convection oven at a temperature of 40° C. for about 48 hours. Then, the dried resulting product was further dried in a vacuum oven at a temperature of 40° C. for about 24 hours, so as to obtain a negative electrode including a PVA-containing protective layer coated on top of the lithium metal thin film. Here, the protective layer had a thickness of about 5 μm.

Example 2: Preparation of Negative Electrode

A negative electrode was prepared in the same manner as in Example 1, except that the composition for forming a protective layer was diluted about 10-fold with DMSO and a protective layer had a thickness of about 1 μm.

Example 3: Preparation of Negative Electrode

A negative electrode was prepared in the same manner as in Example 1, except that a 5 wt % PVA blend solution was used instead of the 5 wt % PVA solution.

The PVA blend solution was prepared in a way that the PVA (having a weight average molecular weight of about $89 \times 10^3$ Daltons to about $98 \times 10^3$ Daltons and a saponification value of about 99 mol %) and poly(acrylonitrile) (having a weight average molecular weight of about 150×

$10^3$ Daltons) were dissolved at a mixed weight ratio of 9:1 in DMSO and the mixed solution was stirred at a temperature of 90° C. for 2 hours.

Example 4: Preparation of Negative Electrode

A negative electrode was prepared in the same manner as in Example 1, except that the PVA had a weight average molecular weight of about $40 \times 10^3$ Daltons (a saponification value of about 99 mol %).

Example 5: Preparation of Negative Electrode

A negative electrode was prepared in the same manner as in Example 1, except that the PVA had a weight average molecular weight of about $130 \times 10^3$ Daltons (a saponification value of about 99 mol %).

Example 6: Preparation of Lithium Metal Battery $LiCoO_2$, a conducting agent (Super-P; available from Timcal Ltd.), polyvinylidene fluoride (PVdF), and N-methylpyrrolidone (NMP) were mixed together to obtain a positive electrode composition. Here, a mixed weight ratio of $LiCoO_2$, the conducting agent, and PVdF was about 97:1.5:1.5.

A coating of the positive electrode composition was applied to a sheet of aluminum foil having a thickness of about 15 μm. Then, the resulting product was dried at a temperature of about 25° C., and then, thermally treated under vacuum at a temperature of about 110° C., so as to obtain a positive electrode.

A polypropylene separator (Celgard 3510) and the positive electrode were stacked on top of the protective layer of the negative electrode of Example 1, thereby preparing a lithium metal battery. Then, a liquid electrolyte was added thereto. The liquid electrolyte was prepared by dissolving 1.3 molar (M) LiPFe in a mixed solvent of diethyl carbonate (DEC) and fluoroethylene carbonate (FEC) having a volume ratio of 6:4.

Example 7: Preparation of Lithium Metal Battery

A lithium metal battery was prepared in the same manner as in Example 6, except that the negative electrode of Example 2 was used instead of the negative electrode of Example 1.

Example 8: Preparation of Lithium Metal Battery

A lithium metal battery was prepared in the same manner as in Example 6, except that the negative electrode of Example 3 was used instead of the negative electrode of Example 1, and a liquid electrolyte prepared by dissolving 1.0 M $LiFSI(LiN(SO_2F)_2)$ in a mixed solvent of 1,2-dimethoxyethane (DME) and tetrafluoroethyl tetrafluoropropyl ether (TTE) having a volume ratio of 2:8 was used instead of the liquid electrolyte prepared by dissolving 1.3 M LiPFe in the mixed solvent of DEC and FEC having a volume ratio of 6:4.

Example 9: Preparation of Lithium Metal Battery

A lithium metal battery was prepared in the same manner as in Example 6, except that the negative electrode of Example 4 was used instead of the negative electrode of Example 1.

Example 10: Preparation of Lithium Metal Battery

A lithium metal battery was prepared in the same manner as in Example 6, except that the negative electrode of Example 5 was used instead of the negative electrode of Example 1.

Example 11: Preparation of PVA Membrane

A PVA (having a weight average molecular weight of about $89 \times 10^3$ to about $98 \times 10^3$ Daltons and a saponification value of about 99 mol %) was dissolved in DMSO, and the mixed solution was stirred at a temperature of about 90° C. for 2 hours, so as to obtain a 5 wt % PVA solution.

Then, LiFSI was added to the PVA solution, so as to obtain a composition for forming a PVA membrane. Here, the PVA and a lithium salt were mixed at a mixed ratio of 3:1, and a ratio of a hydroxyl group of the PVA and lithium of the lithium salt was about 13:1.

Six g of the composition for forming the PVA membrane was cast on a Teflon petri dish and dried in a hot plate at a temperature of 60° C. for about 24 hours. Then, the resulting product was dried in a vacuum oven at a temperature of 40° C. for about 24 hours, so as to prepare a lithium-salt containing PVA membrane (having a thickness of about 5 μm).

Example 12: Preparation of PVA Membrane

A lithium-salt containing PVA membrane was prepared in the same manner as in Example 11, except that in obtaining a composition for forming a PVA membrane, a mixed weight ratio of the PVA to a lithium salt was 3:2 and a mixed molar ratio of a hydroxyl group of the PVA to lithium of a lithium salt was about 6:1.

Example 13: Preparation of PVA Membrane

A lithium-salt containing PVA membrane was prepared in the same manner as in Example 11, except that in obtaining a composition for forming a PVA membrane, a mixed weight ratio of the PVA to a lithium salt was 1:1 and a mixed molar ratio of a hydroxyl group of the PVA to lithium of a lithium salt was 4:1.

Example 14: Preparation of PVA Membrane

A lithium-salt containing PVA membrane was prepared in the same manner as in Example 11, except that in obtaining a composition for forming a PVA membrane, a mixed weight ratio of the PVA to a lithium salt was 3:4 and a mixed molar ratio of a hydroxyl group of the PVA to lithium of a lithium salt was 3:1.

Example 15: Preparation of PVA Membrane

A lithium-salt containing PVA membrane was prepared in the same manner as in Example 11, except that in obtaining a composition for forming a PVA membrane, a mixed weight ratio of the PVA to a lithium salt was 3:5 and a mixed molar ratio of a hydroxyl group of the PVA to lithium of a lithium salt was 2.6:1.

Example 16: Preparation of Lithium Metal Battery

A lithium metal battery was prepared in the same manner as in Example 6, except that a liquid electrolyte prepared by dissolving 1.0M LiFSI in a mixed solvent of 1,2-DME and 1,1,2,2-tetrafluoroethyl 2,2,3,3-tetrafluoropropyl ether: (TTE) having a volume ratio of 2:8 was used instead of the liquid electrolyte prepared by dissolving 1.3M LiPFe in a mixed solvent of DEC and FEC having a volume ratio of 6:4.

Example 17: Preparation of Negative Electrode

A negative electrode was prepared in the same manner as in Example 1, except that the PVA having a weight average molecular weight of about $93.5\times10^3$ Daltons and a saponification value of about 88 mol % was used instead of the PVA having a weight average molecular weight of about $93.5\times10^3$ Daltons and a saponification value of about 99 mol %.

Example 18: Preparation of Lithium Metal Battery

A lithium metal battery was prepared in the same manner as in Example 6, except the negative electrode of Example 17 was used instead of the negative electrode of Example 1.

Example 19: Preparation of Negative Electrode

A negative electrode was prepared in the same manner as in Example 1, except that a 5 wt % PVA blend solution was used instead of the 5 wt % PVA solution.

The PVA blend solution was prepared in a way that the PVA (having a weight average molecular weight of about $89\times10^3$ to about $98\times10^3$ Daltons and a saponification value of about 99 mol %) and poly(acrylonitrile) (having a weight average molecular weight of about $150\times10^3$ Daltons) were dissolved at a mixed weight ratio of 7:3 in DMSO and the mixed solution was stirred at a temperature of 90° C. for 2 hours.

Example 20: Preparation of Lithium Metal Battery

A lithium metal battery was prepared in the same manner as in Example 6, except the negative electrode of Example 19 was used instead of the negative electrode of Example 1.

Examples 21 to 23: Preparation of Negative Electrode

Negative electrodes were prepared in the same manner as in Example 3, except that poly(methyl methacrylate), poly(cyclohexyl methacrylate), and poly(glycidyl methacrylate) were each used instead of poly(acrylonitrile) in preparing the 5 wt % PVA blend solution.

Examples 24 to 26: Preparation of Lithium Metal Battery

Lithium metal batteries were prepared in the same manner as in Example 6, except the negative electrodes of Examples 21-23 were each used instead of the negative electrode of Example 1.

Examples 27 to 30: Preparation of Negative Electrode

Negative electrodes were prepared in the same manner as in Example 19, except that poly(methyl methacrylate), poly(cyclohexyl methacrylate), and poly(glycidyl methacrylate) were each used instead of poly(acrylonitrile) in preparing the 5 wt % PVA blend solution.

Examples 31 to 33: Preparation of Lithium Metal Battery

Lithium metal batteries were prepared in the same manner as in Example 6, except the negative electrodes of Examples 27 to 30 were each used instead of the negative electrode of Example 1.

Example 34: Preparation of Negative Electrode

A negative electrode was prepared in the same manner as in Example 1, except that the PVA having a weight average molecular weight of about $93.5\times10^3$ Daltons and a saponification value of about 85 mol % was used instead of the PVA having a weight average molecular weight of about $93.5\times10^3$ Daltons and a saponification value of about 99 mol %.

Example 35: Preparation of Lithium Metal Battery

A lithium metal battery was prepared in the same manner as in Example 6, except the negative electrode of Example 34 was used instead of the negative electrode of Example 1

Comparative Example 1: Lithium Metal Thin Film

The same lithium metal thin film having a thickness of about 20 μm was used.

Comparative Example 2: Preparation of PVA Membrane

A PVA (having a weight average molecular weight of about $93.5\times10^3$ Daltons and a saponification value of about 99 mol %) was dissolved in DMSO, and the mixed solution was stirred at a temperature of about 90° C. for 2 hours, so as to obtain a 5 wt % PVA solution.

Six g of the PVA solution was cast on a Teflon Patris dish and dried in a hot plate at a temperature of 60° C. for about 24 hours. Then, the resulting product was dried in a vacuum oven at a temperature of 40° C. for about 24 hours, so as to obtain a lithium-salt containing PVA membrane (having a thickness of about 5 μm).

Comparative Example 3: Preparation of Lithium Metal Battery

A lithium metal battery was prepared in the same manner as in Example 6, except that a lithium metal thin film of Comparative Example 1 was used instead of the negative electrode of Example 1.

$LiCoO_2$, a conducting agent (Super-P®; Timcal Ltd.), PVdF, and NMP were mixed together to obtain a positive electrode composition. Here, a mixed weight ratio of $LiCoO_2$, the conducting agent, and the PVdF was about 97:1.5:1.5.

A coating of the positive electrode composition was applied to a sheet of aluminum foil having a thickness of about 15 μm. Then, the resulting product was dried at a temperature of 25° C., and then, thermally treated under vacuum at a temperature of 110° C., so as to obtain a positive electrode.

A polypropylene separator (Celgard 3510) was disposed between the positive electrode and the lithium metal thin film (having a thickness of about 20 μm), and a liquid electrolyte prepared by dissolving 1.3 M LiPFe in a mixed solvent of DEC and FEC having a volume ratio of about 6:4 was added thereto, thereby preparing a lithium metal battery.

Evaluation Example 1: X-Ray Diffraction (XRD) Analysis

The PVA membranes of Examples 11, 12, and 14 and Comparative Example 2 were subjected to XRD analysis by using a CuK-alpha characteristics X-ray wavelength of 1.541 Å. Here, a Rigaku RINT2200HF+ diffractometer using CuK-α radiation (1.540598 Å) was used as an XRD analyzer.

Figure 3:
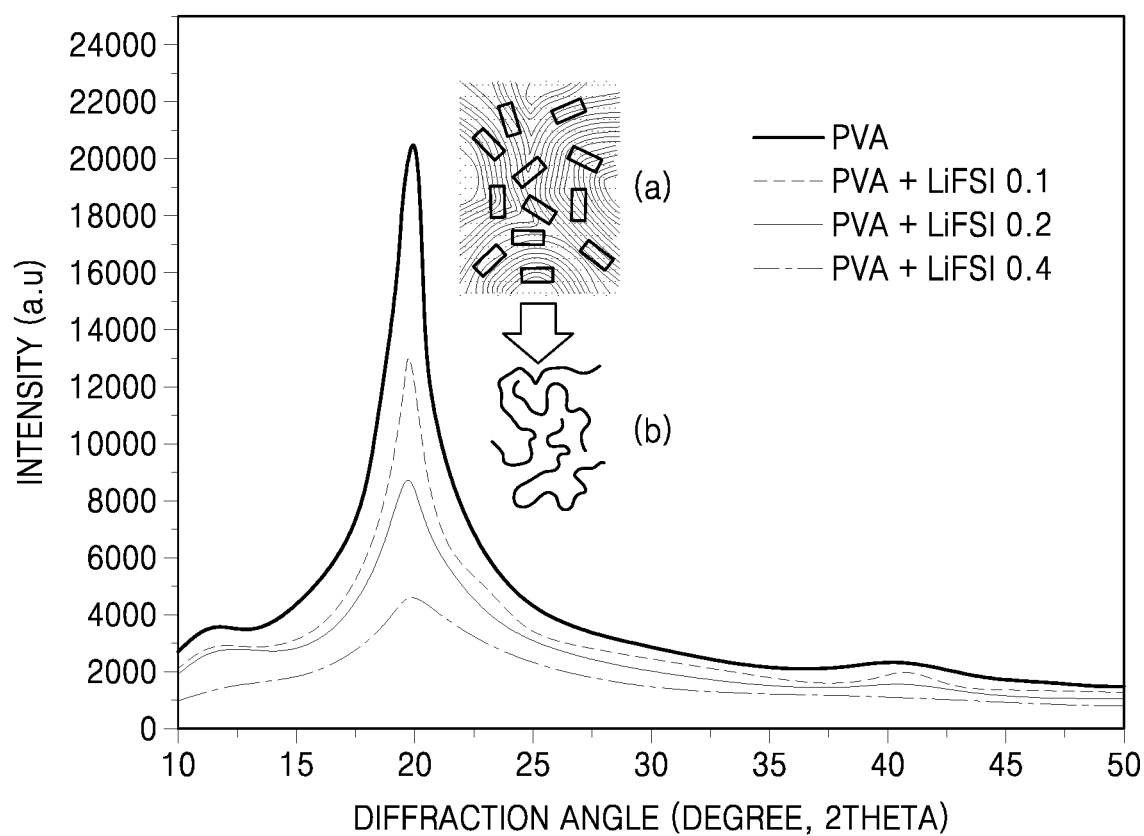
FIG. 3 is a graph illustrating intensity (arbitrary units, a.u.) versus diffraction angle (degrees 2-theta) as determined by X-ray diffraction (XRD) analysis for the poly(vinyl alcohol) membranes prepared according to Examples 11, 12, and 14, and Comparative Example 2.

The XRD analysis results with respect to the PVA membranes of Examples 11, 12, and 14 and Comparative Example 2 are shown in FIG. 3. In addition, full width at half maximum values of main peaks at diffraction angles two theta (2θ) of about 12.5° to about 27.5° in the XRD patterns are shown in Table 1.

In FIG. 3, a diagram (a) represents PVA in a crystalline state, and a diagram (b) represents PVA in an amorphous state upon the addition of the lithium salt. In FIG. 3, the labels of PVA+LiFSI 0.1, PVA+LiFSI 0.2, PVA+LiFSI 0.4, and PVA respectively denote the PVA membranes of Example 11, Example 12, Example 14, and Comparative Example 2.

TABLE 1

| | Full width at half maximum (°) |
|---|---|
| Example 11 | 3 |
| Example 12 | 5 |
| Example 14 | 7 |
| Comparative Example 2 | 2 |

Referring to FIG. 3 and Table 1, it was confirmed that the full width half-maximum values of the main peaks which appeared with respect to the PVA membranes of Examples 11, 12, and 14 were greater than the full width half-maximum value of the main peak which appeared with respect to the PVA membrane of Comparative Example 2. It was also confirmed that the full width half-maximum values increased according to the amount of the lithium salt contained in the PVA membranes. In addition, it was confirmed that the inclusion of the lithium salt in the PVA membrane modified the crystal structure of the PVA, and thus, the PVA membrane including the lithium salt was in an amorphous state. When the PVA membrane included increased amounts of the lithium salt, the PVA was more likely to be in an amorphous state. As such, when the PVA membrane was in the amorphous state, the lithium ion conductivity of the polymer may improve.

Evaluation Example 2: Differential Scanning Calorimetry (DSC)

The PVA membranes of Examples 11, 12, and 14 were analyzed by using DSC. Here, the TA Q2000 (TA Instruments company) was used as a DSC analyzer.

Figure 4:
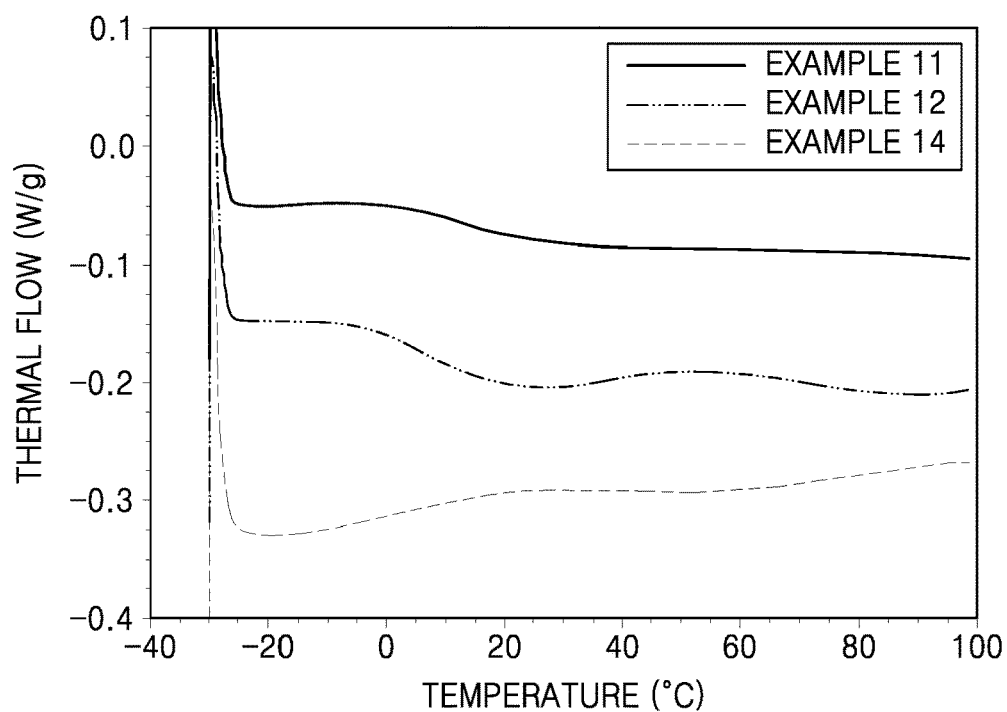
FIG. 4 is a graph illustrating thermal flow (watts per gram, W/g) versus temperature (degrees Celsius, ° C.) which shows the results of differential scanning calorimetry (DSC) for the poly(vinyl alcohol) membranes prepared according to Examples 11, 12, and 14.

The DSC results with respect to the PVA membranes of Examples 11, 12, and 14 are shown in FIG. 4.

Referring to FIG. 4, it was confirmed that, according to the concentration of the lithium salt in the PVA membrane, the PVA structure was changed from a crystalline state to an amorphous state and a glass transition temperature thereof was also decreased.

Evaluation Example 3: Impedance Measurement

1) Example 1 and Comparative Example 1

An electrolyte was assembled with each of the lithium metal thin film of Example 1 and the lithium negative electrode of Comparative Example 1 to prepare Li/Li symmetrical cells A and B. Here, the electrolyte was prepared by dissolving 1.3 M LiPF$_6$ in a mixed solvent of DEC and FEC mixed at a volume ratio of 6:4.

Impedance measurements were performed on each of the Li/Li symmetrical cells A and B using an impedance measuring device (Solartron 1260A Impedance/Gain-Phase Analyzer) at a temperature of about 25° C. according to a 2-probe method. The amplitude was about ±10 millivolts (mV) and a frequency range was about 0.1 hertz (Hz) to about 1 megahertz (MHz).

Figure 5:
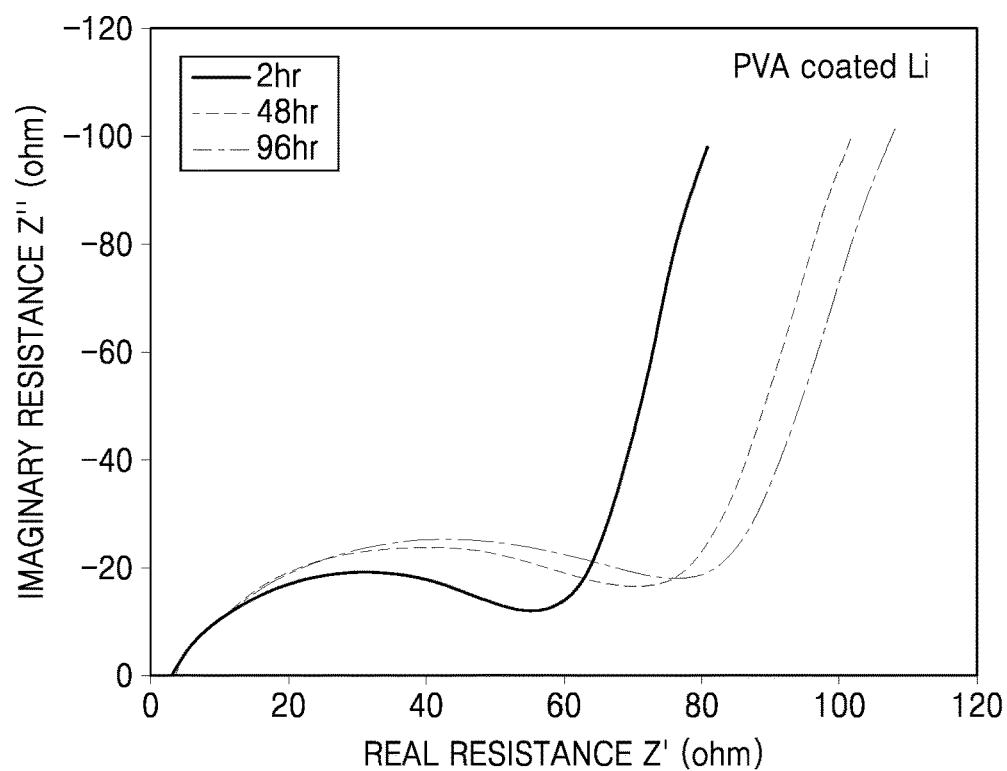
FIGS. 5 and 6 show Nyquist plots of imaginary impedance (Z", ohms) versus real impedance (Z', ohms) obtained from impedance measurements performed on symmetrical cells using the negative electrodes prepared according to Example 1 and Comparative Example 1, respectively.
Figure 6:
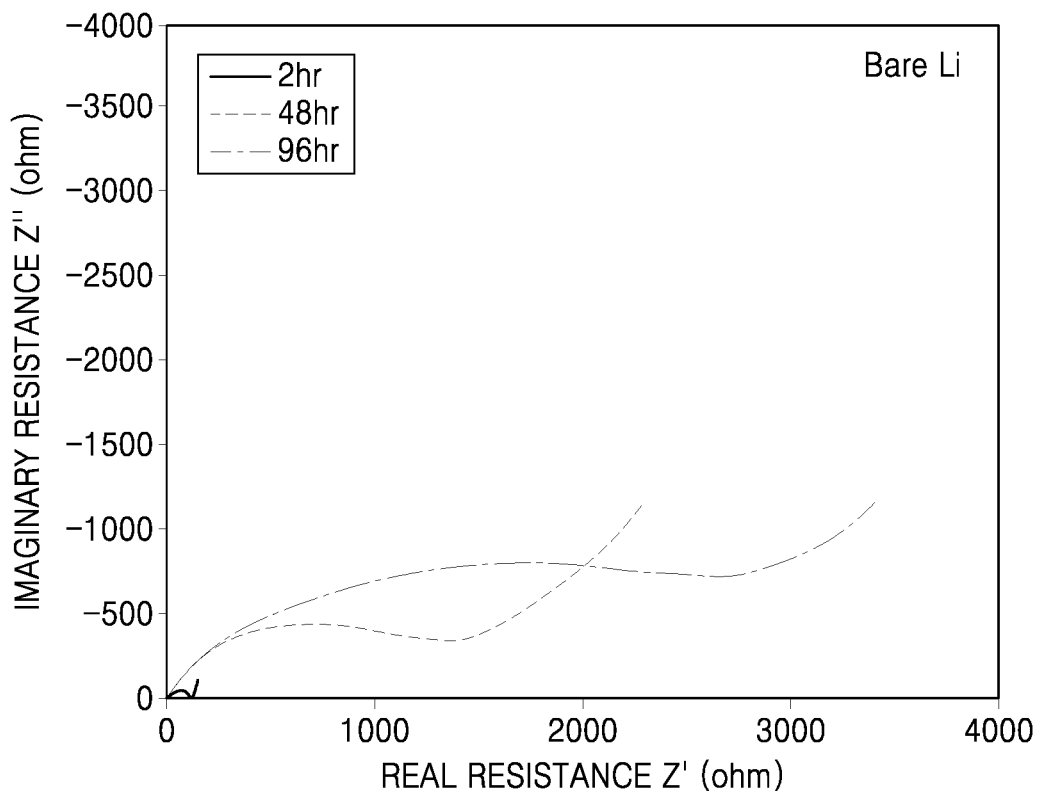

Regarding the Li/Li symmetrical cells A and B, respectively prepared using the negative electrode of Example 1 and the negative electrode of Comparative Example 1, Nyquist plots prepared from the impedance measurements obtained 24 hours, 48 hours, and 96 hours after the manufacture of the Li/Li symmetric cells A and B are shown in FIGS. 5 and 6, respectively. In FIGS. 5 and 6, an interfacial resistance ($R_{inf}$) of the symmetric cell A (FIG. 5) and the symmetric cell B (FIG. 6) is determined by the position and size of the semicircular portion of the curve. The interfacial resistance results obtained by analyzing graphs of FIGS. 5 and 6 are shown in Table 2.

TABLE 2

| Hours (hr) | Interfacial resistance ($R_i$) of symmetric cell A (ohm) | Interfacial resistance ($R_i$) of symmetric cell B (ohm) |
|---|---|---|
| 24 | 61 | 48 |
| 48 | 77 (+16) | 1564 (+1516) |
| 96 | 82 (+5) | 3269 (+1705) |

In Table 2, the values in parentheses represent the respective resistance increments.

Referring to Table 2 and FIGS. 5 and 6, it was confirmed that the increase in the interfacial resistance of the symmetric cell A prepared using the negative electrode of Example 1, had eased off over the period of time, compared to the increase in the interfacial resistance of the symmetric cell B prepared using the negative electrode of Comparative Example 1. Accordingly, it was confirmed that the protective layer included in the negative electrode of Example 1 showed excellent performance in stabilizing the interface.

Evaluation Example 4: Charge-Discharge Characteristics (Initial Charge-Discharge Characteristics)

Figure 7:
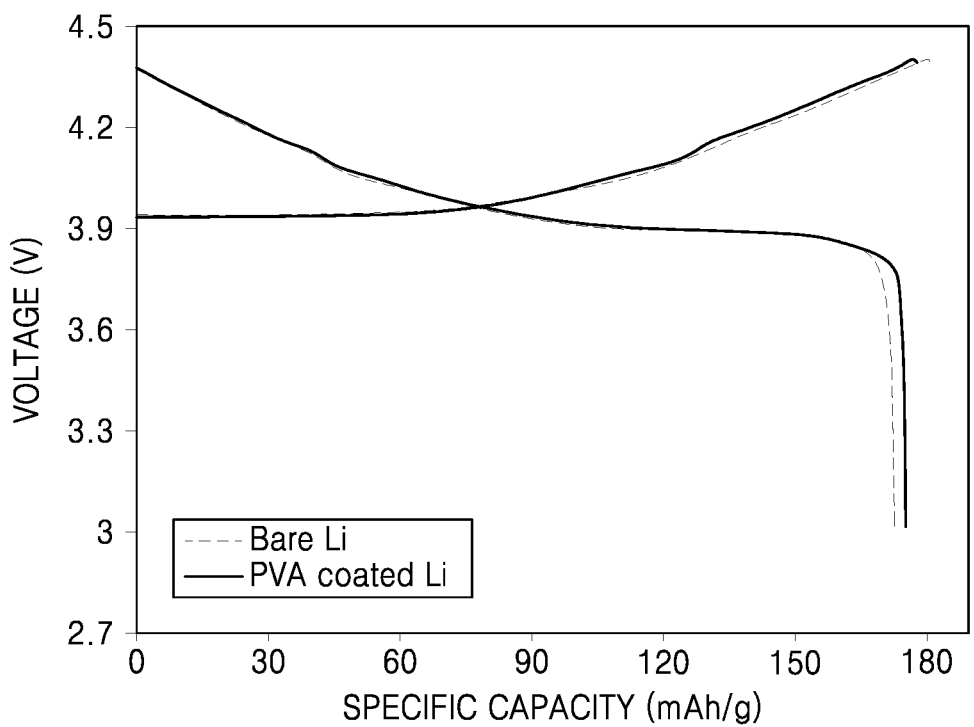
FIG. 7 is a graph illustrating voltage (V) versus specific capacity (milliampere-hours per gram, mAh/g) and showing charge and discharge characteristics of coin-half cells prepared according to Example 6 and Comparative Example 3.

Charge-discharge characteristics of the lithium metal batteries (coin cells) of Examples 6 and 18 and Comparative Example 3 were evaluated using a TOYO-3100 device (manufacturer: TOYO), and the results are shown in FIG. 7 and Table 3.

To confirm initial charge-discharge characteristics of the coin cells of Examples 6 and 18 and Comparative Example 3, a first cycle of charge and discharge was performed once at a constant current of 0.1 C. The coin cells were charged with a constant current (CC) with a constant current of 0.5 C at a voltage in a range of about 3.0 V to about 4.4 V (vs. lithium metal) up to a cut-off voltage of about 4.4 V. After reaching the cut-off voltage of 4.4 V, each of the coin cells was charged with a constant voltage (CV) till a cutoff current of 0.05 C. Then, the coin cells were discharged with a CC with a constant current of 0.5 C till a cutoff voltage of 3.0 V.

(1) Initial Charge-Discharge Efficiency (%).

The Initial charge-discharge efficiency of the coin cells was measured using Equation 1.

$$\text{Initial charge-discharge efficiency [\%]} = [1^{st} \text{ cycle discharge capacity}/1^{st} \text{ cycle charge capacity}] \times 100\% \quad \text{Equation 1}$$

(2) Initial Charge and Discharge Capacities.

The lithium metal batteries of Example 6 and Comparative Example 3 were subjected to measurement of charge and discharge capacity during the first cycle, and the results are shown in FIG. 7 and Table 3.

TABLE 3

| | Charge capacity (mAh/g) | Discharge capacity (mAh/g) | Initial Charge-discharge efficiency (%) |
|---|---|---|---|
| Comparative Example 3 | 180.4 | 172.8 | 95.8 |
| Example 6 | 177.9 | 175.4 | 98.6 |

Referring to Table 3 and FIG. 7, the charge capacity of the lithium metal battery of Comparative Example 3 was greater than the charge capacity of the lithium metal battery of Example 6, which resulted from the reductive degradation of the electrolyte in the lithium electrode. In addition, the charge-discharge efficiency of the lithium metal battery of Example 6 was greater than the charge-discharge efficiency of the lithium metal battery of Comparative Example 3, which resulted from a smaller irreversible loss upon electrolytic degradation in the lithium metal battery of Example 6 during charging.

In addition, the lithium metal battery of Example 18 showed the initial charge-discharge characteristics equivalent to those of the lithium metal battery of Example 6.

Evaluation Example 5: Charge-Discharge Characteristics (Capacity Retention Rate)

1) Examples 6, 7, and 18 and Comparative Example 3

Each of the lithium metal batteries of Examples 6, 7, 18 and Comparative Example 3 was charged at room temperature (25° C.) with a constant current of 0.5 C rate at a voltage in a range of about 3.0 V to about 4.4 V (vs. lithium metal) up to a cut-off voltage of about 4.4 V. After reaching the cut-off voltage of 4.4 V, each of the lithium metal batteries was charged with a constant voltage till a cutoff current of 0.1 C rate, and then, discharged with a constant current of 0.5 C rate to a cut-off voltage of about 3.0 V.

The above cycle of charging and discharging was repeated 60 times.

The capacity retention rate of each of the lithium metal batteries was calculated using Equation 2 and the results are shown in Table 8.

$$\text{Capacity retention rate (\%)} = (60^{th} \text{ cycle discharge capacity}/\text{1st cycle discharge capacity}) \times 100\% \quad \text{Equation 2}$$

Figure 8A:
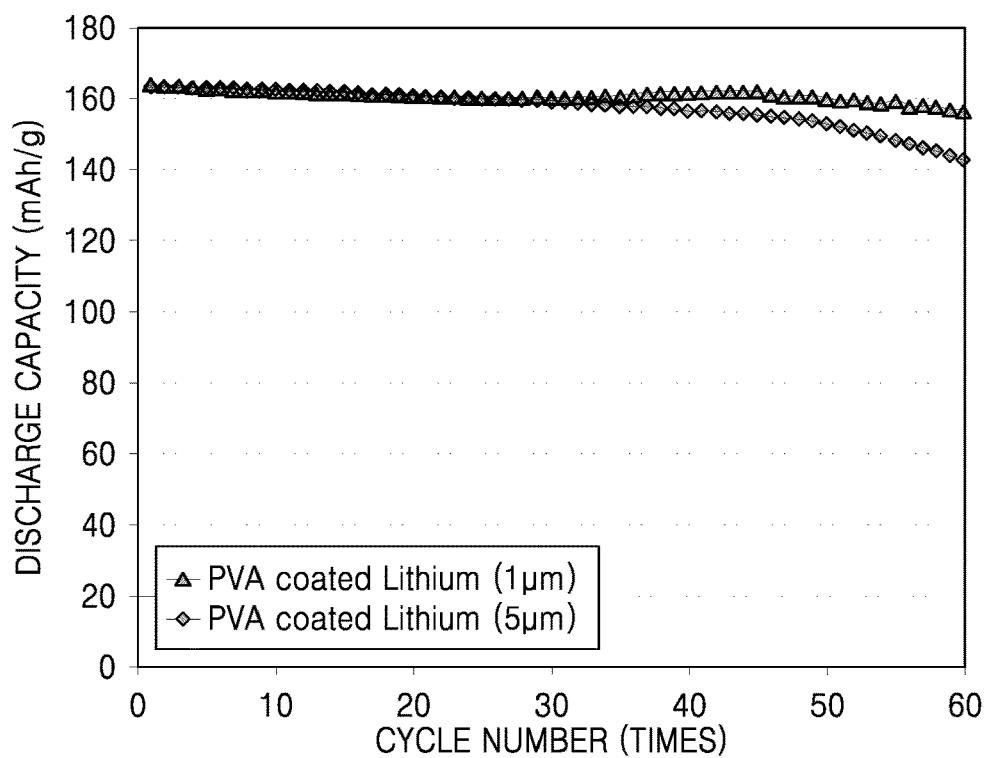
FIGS. 8A and 8B each are graphs illustrating discharge capacity (mAh/g) versus cycle number (times) and showing changes in discharge capacity, charge efficiency, and discharge efficiency of lithium metal batteries prepared according to Examples 6 and 7.
Figure 8B:
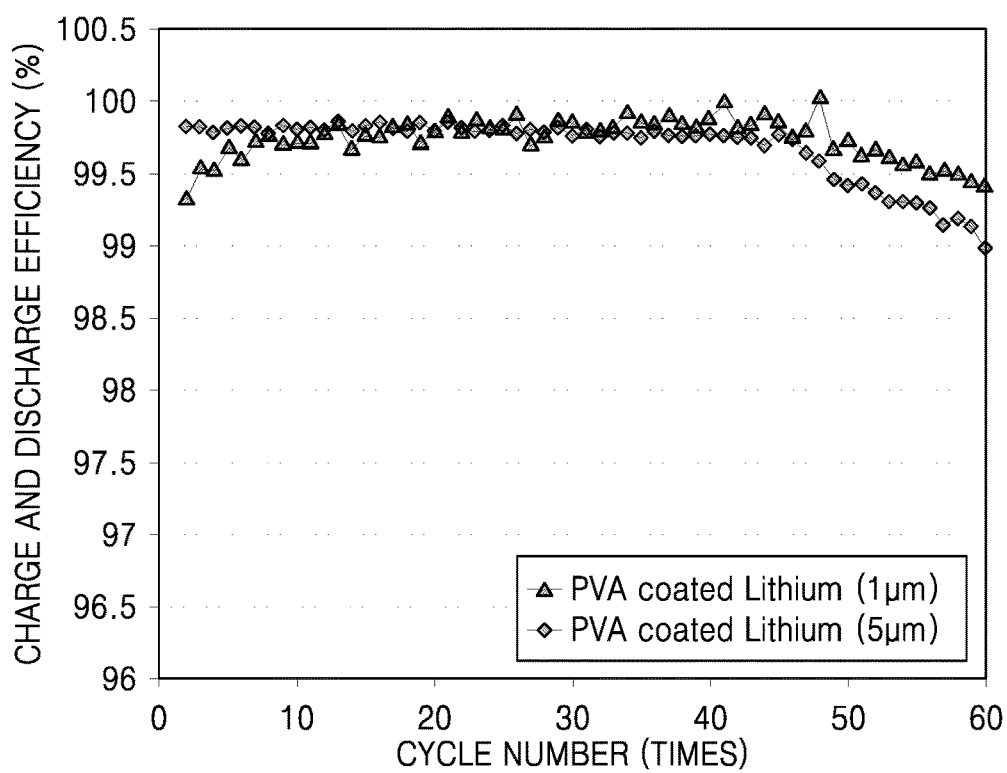
Figure 9A:
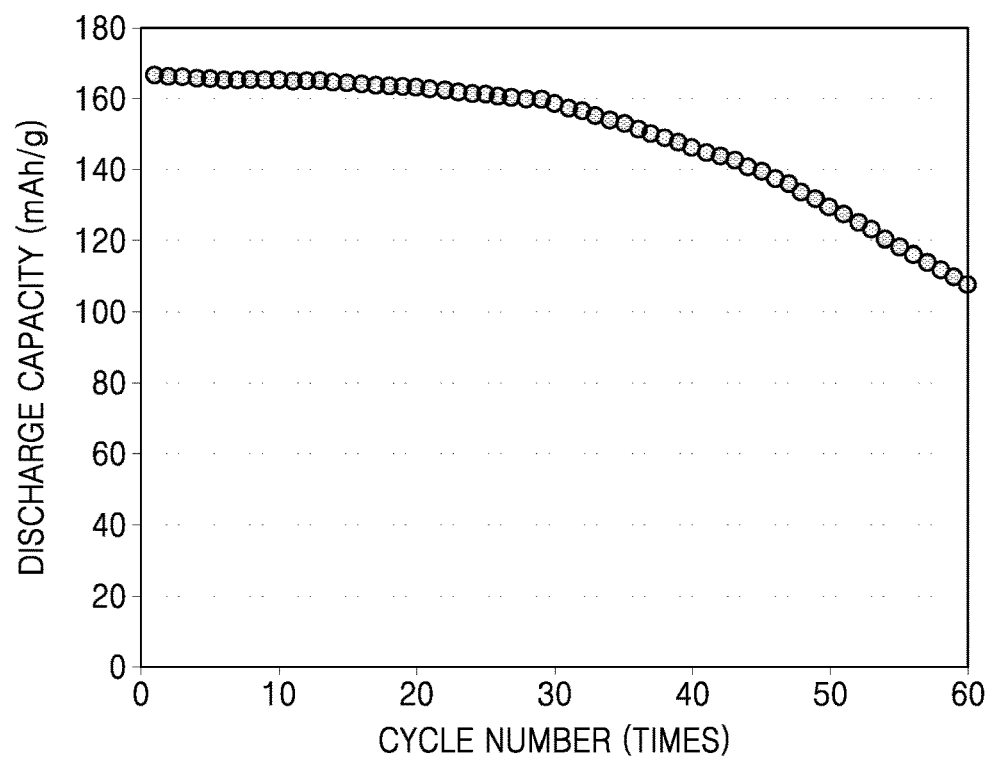
FIGS. 9A and 9B each are graphs illustrating discharge capacity (mAh/g) versus cycle number (times) and showing changes in discharge capacity and charge and discharge efficiency of a lithium metal battery prepared according to Comparative Example 3.
Figure 9B:
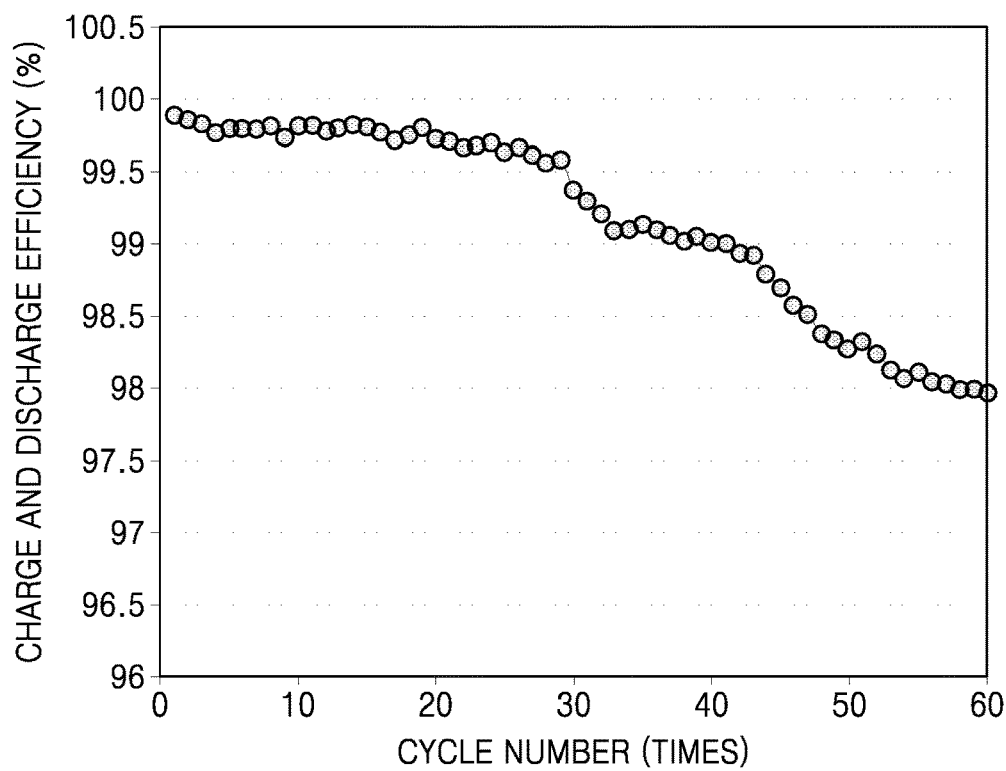

The results of evaluating the charge-discharge characteristics of the lithium metal batteries of Examples 6 and 7 and Comparative Example 3 are shown in Table 4 and FIGS. 8A, 8B, 9A, and 9B. FIGS. 8A and 8B are each graphs showing changes in the discharge capacity and the charge-discharge efficiency with increasing cycle number for the lithium metal batteries of Examples 6 and 7, and FIGS. 9A and 9B are each graphs showing changes in the discharge capacity and the charge-discharge efficiency with increasing cycle number for the lithium metal battery of Comparative Example 3. In FIGS. 8A and 8B, PVA coated lithium (5 μm) refers to the lithium metal battery of Example 6 and PVA coated lithium (1 μm) refers to the lithium metal battery of Example 7.

TABLE 4

| Division | $60^{th}$ cycle capacity retention rate (%) | Charge-discharge efficiency (%) |
|---|---|---|
| Example 6 | 87.3 | 99.6 |
| Example 7 | 95.4 | 99.7 |
| Comparative Example 3 | 64.9 | 99.1 |

Referring to Table 4 and FIGS. 8A, 8B, 9A, and 9B, it was confirmed that the lithium metal batteries of Examples 6 and 7 have significantly improved capacity retention rates as compared to the lithium metal battery of Comparative Example 3.

As shown in FIG. 9B, the lithium metal battery of Comparative Example 3, which was prepared using the lithium metal not including the protective layer, was found to have a rapid decrease in charge-discharge efficiency after the $30^{th}$ cycle of charging and discharging. However, as shown in FIG. 8B, the lithium metal batteries of Examples 6 and 7 were found to maintain charge-discharge efficiencies of at least 99% until at least the $60^{th}$ cycle of charging and discharging.

In addition, the lithium metal battery of Example 18 was found to have a charge-discharge retention rate equivalent to that of the lithium metal battery of Example 6.

2) Examples 8 and 16

Figure 13A:
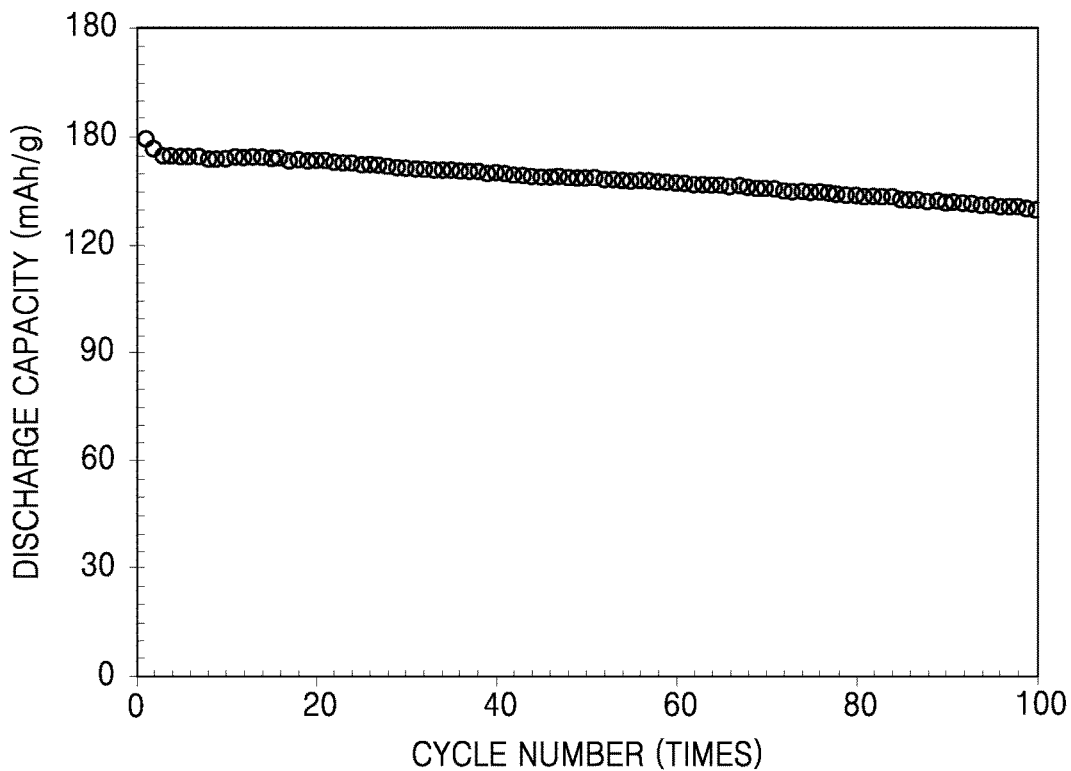
FIGS. 13A and 13B each are graphs illustrating discharge capacity (mAh/g) versus cycle number (times) of lithium metal batteries prepared according to Examples 8 and 16, respectively.
Figure 13B:
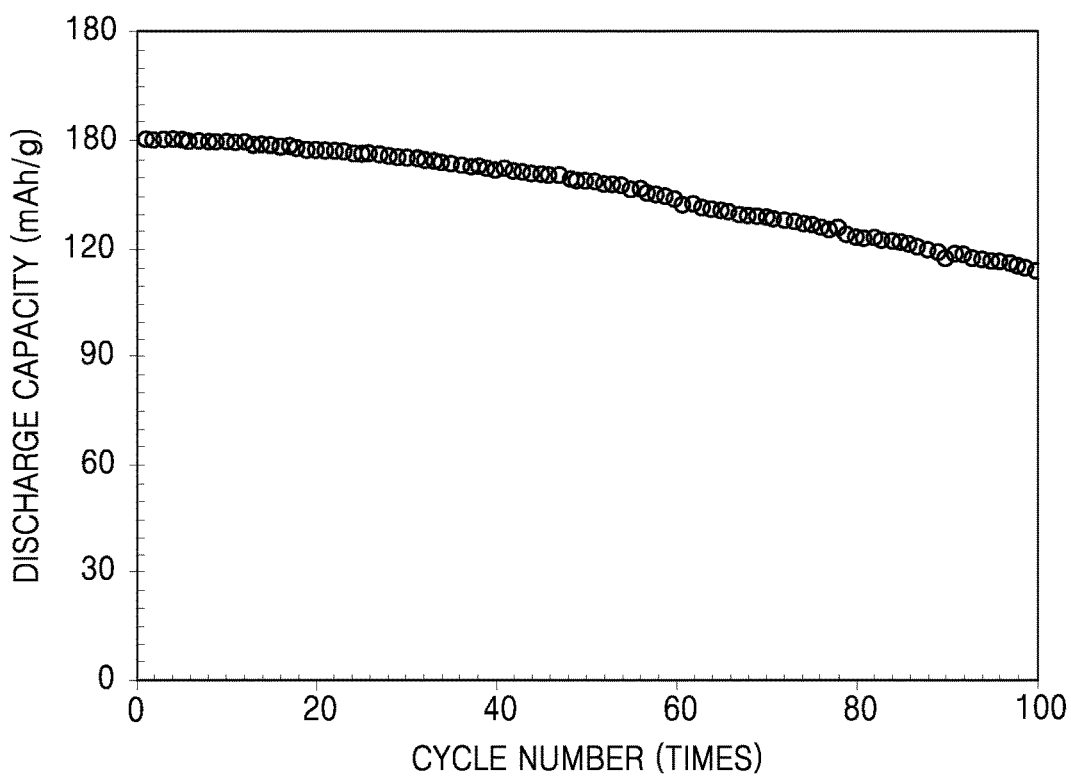

The above cycle of charging and discharging performed with respect to the lithium metal batteries of Examples 6, 7, and 18 and Comparative Example 3 was performed 100 times for each of the lithium metal batteries of Examples 8 and 16, and changes in discharge capacity are shown in FIGS. 13A and 13B.

Referring to FIGS. 13A and 13B, it was confirmed that the lithium metal batteries of Examples 8 and 16 each had an excellent capacity retention rate.

3) Examples 9 and 10

Figure 14:
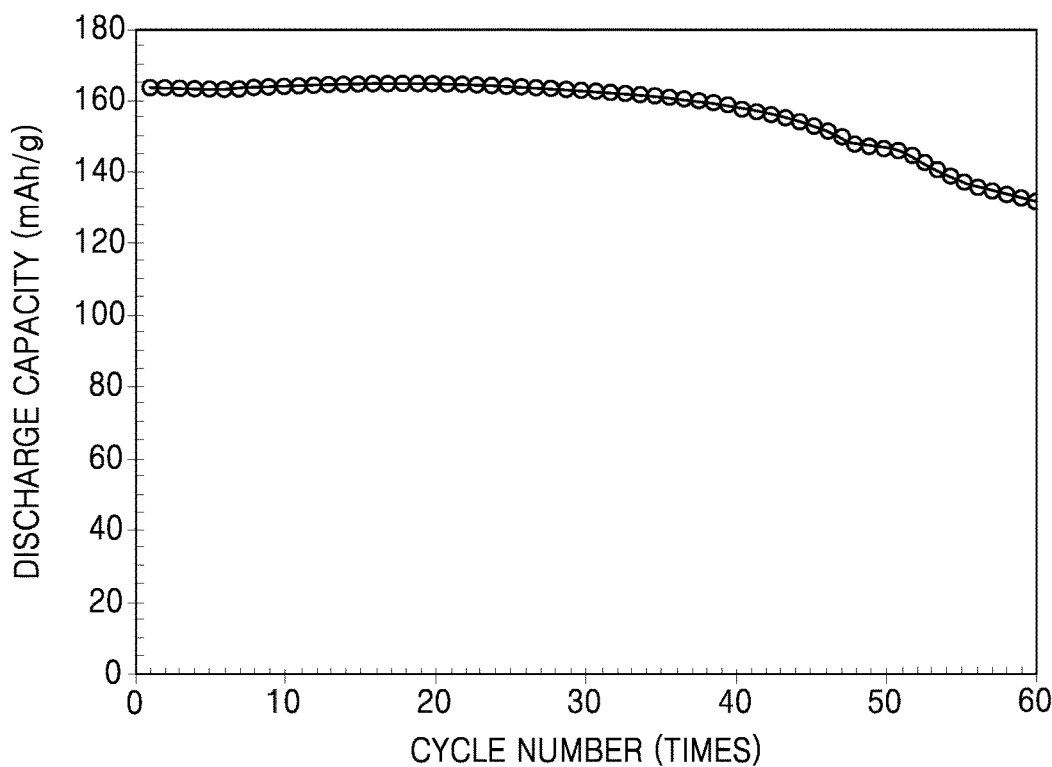
FIGS. 14 and 15 each are graphs illustrating discharge capacity (mAh/g) versus cycle number (times) of lithium metal batteries prepared according to Examples 9 and 10, respectively.
Figure 15:
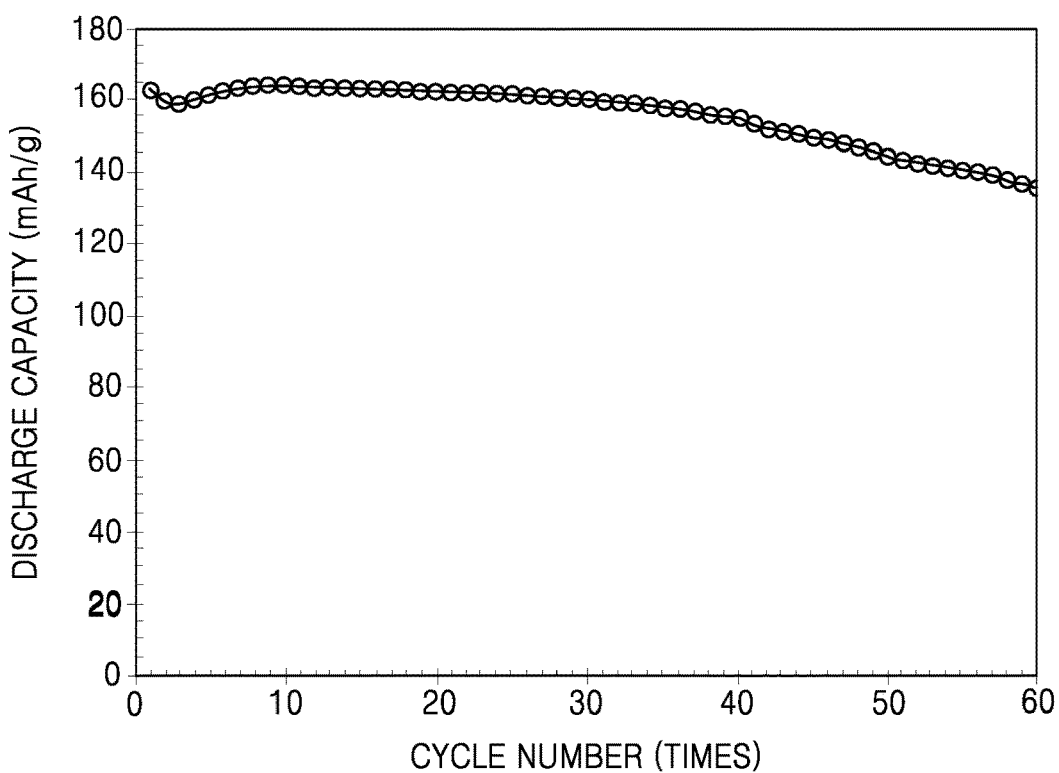

The above cycle of charging and discharging performed with respect to the lithium metal batteries of Examples 6, 7, and 18 and Comparative Example 3 was performed 60 times for each of the lithium metal batteries of Examples 9 and 10, and changes in discharge capacity are shown in FIGS. 14 and 15.

Referring to FIGS. 14 and 15, it was confirmed that the lithium metal batteries of Examples 9 and 10 each had an excellent capacity retention rate.

4) Examples 20, 24 to 26, and 31 to 33

The capacity retention rates of the lithium metal batteries of Examples 20, 24 to 26, and 31 to 33 were measured according to the method performed on the lithium metal batteries of Examples 8 and 16.

As a result of the measurement, it was confirmed that the lithium metal batteries of Examples 20, 24 to 26, and 31 to 33 exhibited the capacity retention rates at the same level as the lithium metal battery of Example 8.

5) Examples 6, 18, and 35

The capacity retention rates of the lithium metal batteries of Examples 6, 18, and 35 were measured according to the method performed on the lithium metal batteries of Examples 8 and 16.

As a result of the measurement, it was confirmed that the lithium metal batteries of Examples 18 and 35 exhibited the capacity retention rates at the same level as the lithium metal battery of Example 6.

Evaluation Example 6: Rate Capability

Each of the lithium metal batteries of Example 6 and Comparative Example 3 was charged at room temperature (25° C.) with a constant current of 0.1 C rate to a voltage of 4.4 V and then till a cut-off current of 0.05 C rate in a constant current mode of 4.4 V, and was then discharged with a current of 0.1 C rate to a voltage of 3.0 V. The above cycle of charging and discharging was then performed 2 additional times to complete the formation process.

Each of the lithium metal batteries after the formation process was charged with a constant current of 0.2 C to a voltage of about 4.4 V, and then discharged with a constant current of 0.2 C to a voltage of 3.0 V. This cycle of charging and discharging was repeated 5 times, each sequentially with a constant current of 0.2 C, 0.5 C, 1.0 C, 2.0 C, and 0.2 C.

Figure 10:
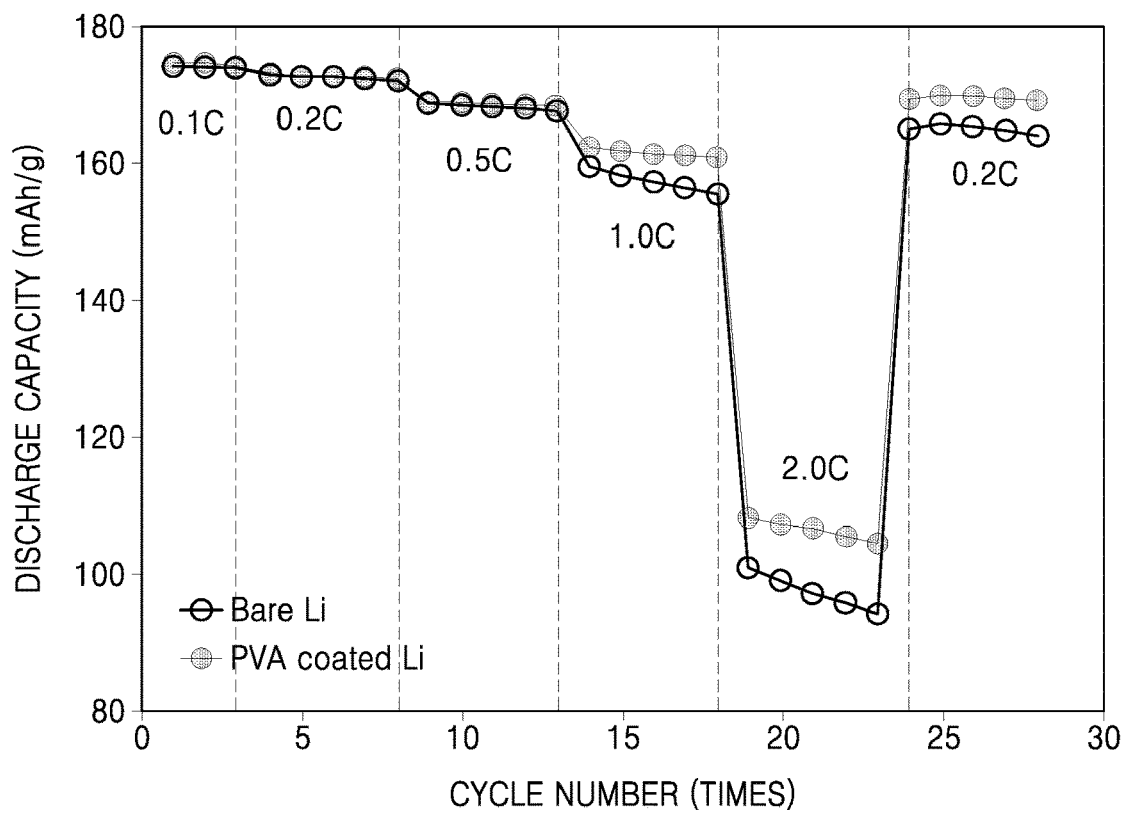
FIG. 10 is a graph illustrating discharge capacity (mAh/g) versus cycle number (times) of lithium metal batteries prepared according to Example 6 and Comparative Example 3.

In addition, changes in discharge capacity of each of the lithium metal batteries are shown in FIG. 10.

The rate capability of each of the lithium metal batteries was calculated using Equation 3.

Rate capability (%)=(Discharge capacity after cell discharging with 1 C or 2 C)/(Discharge capacity after cell discharging with 0.2 C)×100%    Equation 3

TABLE 5

| Division | Rate capability (1 C/0.2 C)(%) | Rate capability (2.0 C/0.2 C)(%) |
| --- | --- | --- |
| Example 6 | 93.6 | 62.4 |
| Comparative Example 3 | 62.4 | 58.3 |

Referring to Table 5 and FIG. 10, the coin cell of Example 6 was found to have excellent high-efficiency discharge characteristics compared to the coin cell of Comparative Example 3. The term "excellent high-efficiency discharge characteristics" refers to small reduction rate in the normalized capacity (i.e., capacity retention rate) with an increase in the discharge rate (C-rate). As such, the excellent high-efficiency discharge characteristics may be a result of the stabilized lithium interface established due to the coating of the protective layer.

Evaluation Example 7: Measurement of Ion Conductivity

The PVA membranes of Examples 11 to 15 were subjected to ion conductivity measurements as follows. The protective layers of Examples 11 to 15 were applied with a bias voltage of 10 millivolts (mV) in a frequency range of 1 Hz to 1 MHz at a temperature of 25° C. to thereby measure the resistance by scanning the temperatures of the protective layers. The ion conductivity on the PVA membranes was evaluated, and the results are shown in FIG. 11.

Figure 11:
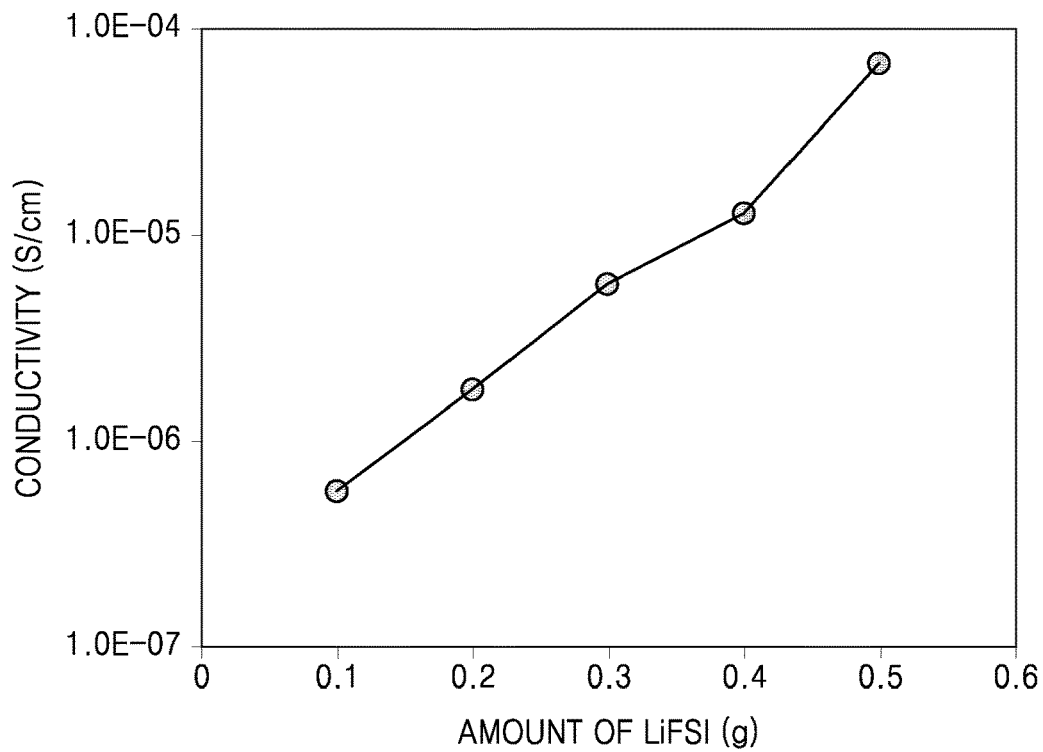
FIG. 11 is a graph illustrating conductivity (Siemens per centimeter, S/cm) versus amount of LiFSI (grams, g) contained in poly(vinyl alcohol) membranes prepared according to Examples 11 to 15.

Referring to FIG. 11, it was confirmed that the PVA membranes had greater ion conductivity at room temperature as the amount of the lithium salt contained therein increased.

Evaluation Example 8: Measurement of Tensile Modulus and Elongation

The PVA membranes of Examples 11 and 12 and the PVA membrane of Comparative Example 2 were subjected to tensile modulus measurements using DMA800 (TA Instruments Company). Samples of the PVA membranes were prepared and tensile modulus was measured according to the ASTM standard D412 (Type V specimens). The tensile modulus is also called Young's modulus.

Changes in the strain of the PVA membranes were evaluated under conditions of a temperature of about 25° C. and about 30% relative humidity at a rate of 5 millimeters per minute (mm/minute), and the results are shown in Table 6.

Figure 12A:
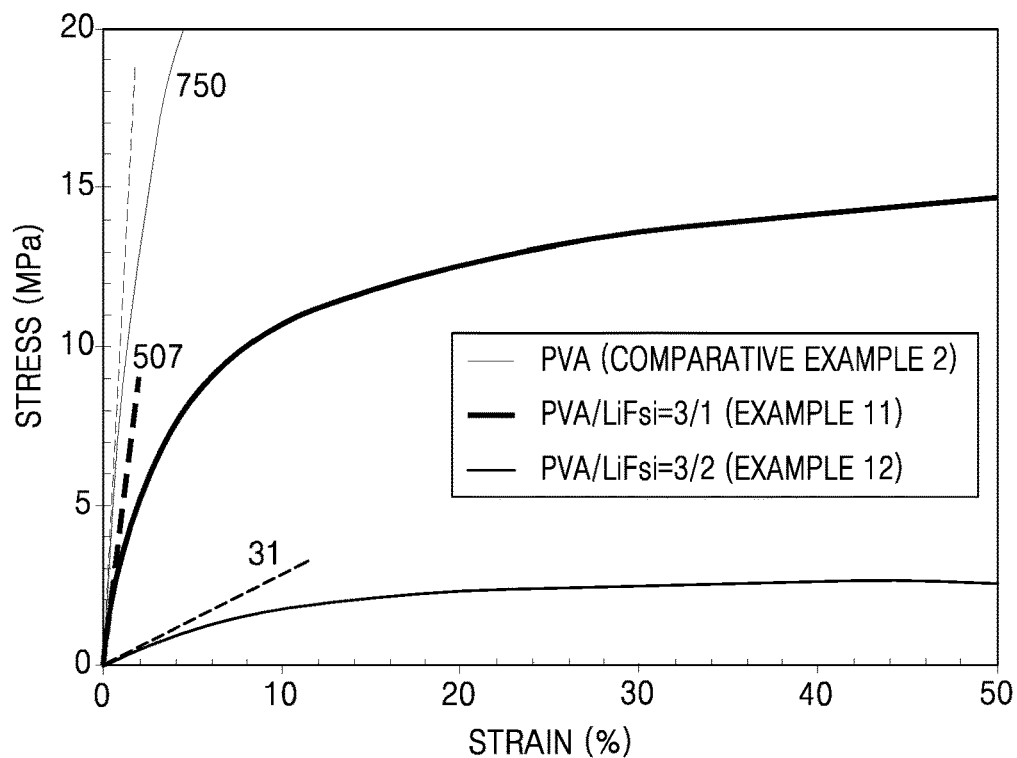
FIG. 12A is a graph illustrating stress (megaPascals, MPa) versus strain (percent, %) for poly(vinyl alcohol) membranes prepared according to Examples 11 and 12, and Comparative Example 2.

FIG. 12A shows stress-strain curves for the PVA membranes of Examples 11 and 12 and the PVA membrane of Comparative Example 2. In addition, FIG. 12B is a graph showing changes in elongation in accordance with the amount of lithium in the PVA membranes for Examples 11 and 12 and Comparative Example 2.

TABLE 6

| Division | Tensile modulus (MPa) | Elongation (%) |
| --- | --- | --- |
| Example 11 | 507 | 100 |
| Example 12 | 31 | 200 |
| Comparative Example 2 | 750 | 20 |

Figure 12B:
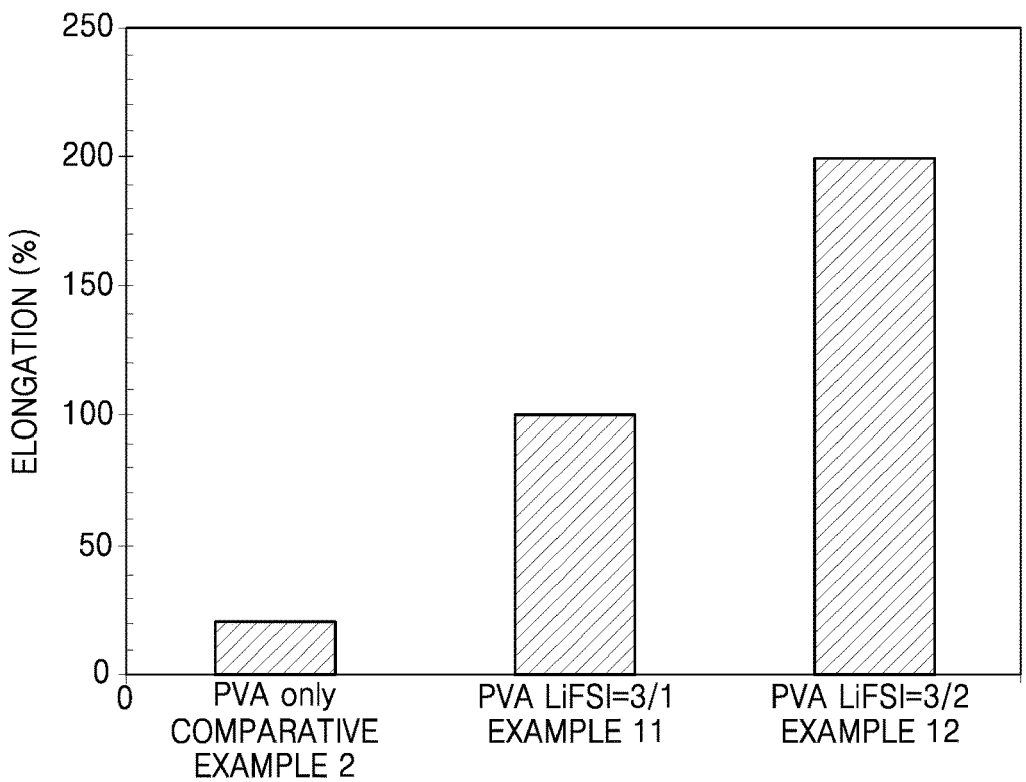
FIG. 12B is a graph illustrating elongation (%) versus the amount of lithium included in the poly(vinyl alcohol) membranes prepared according to Examples 11 and 12 and Comparative Example 2, respectively.

Referring to Table 6 and FIGS. 12A and 12B, the PVA membrane of Example 11 had a tensile modulus of about 507 megapascals (MPa), indicating that the PVA membrane of Example 11 had excellent elasticity and mechanical strength as much as those of the PVA membrane of Comparative Example 2. In addition, it was found that the PVA membrane of Comparative Example 2 had an elongation of about 20%, indicating that the low strain value of the PVA membrane of Comparative Example 2 increases brittleness. Meanwhile, the PVA membranes of Examples 11 and 12 were found to have increased elongation of at least 5 times as much as that of the PVA membrane of Comparative Example 2. As such, the PVA membrane of Examples 11 and 12 showed excellent results in terms of both the tensile modulus and the elongation.

Evaluation Example 9: Peel Strength

The composition for forming each of the protective layers of Examples 1, 17, and 34 was (diluted 6-fold with DMSO, and then, cast on a surface of a sheet of stainless steel (SUS304) using a doctor blade. The coated surface was dried in a convection oven for about 48 hours at a temperature of 40° C. Then, the resulting product was further dried in a vacuum oven for about 24 hours at a temperature of 40° C., thereby preparing a structure in which a PVA-containing protective layer is formed on the sheet of stainless steel. Here, a thickness of the protective layer was about 5 μm.

The protective layer was subjected to a peel strength measurement according to the ASTM D6862 90 peel strength analysis. The results are shown in Table 7.

The peel strength test was performed according to the adhesion test (under conditions of peeling rate of 50 mm/min and a peeling angle of about 90 degree), and the results are shown in Table 7.

TABLE 7

| Division | Peel strength (MPa) |
| --- | --- |
| Example 1 | 30 |
| Example 17 | 21 |
| Example 34 | 18 |

Referring to Table 7, it was confirmed that the protective layer formed by using the composition for forming each of the protective layers of Examples 1, 17, and 34 had a high peel strength.

Evaluation Example 10: Thermogravimetric Analysis (TGA)

The composition for forming the protective layer of Example 1 was diluted 6-fold with DMSO, and then, cast on a surface of stainless steel (SUS304) using a doctor blade. The coated surface was dried in a convection oven for about 48 hours at a temperature of 40° C. Then, the resulting product was further dried in a vacuum oven for about 24 hours at a temperature of 40° C., thereby preparing a structure in which a PVA-containing protective layer is formed on the stainless steel. Here, a thickness of the protective layer was about 5 μm.

Figure 16:
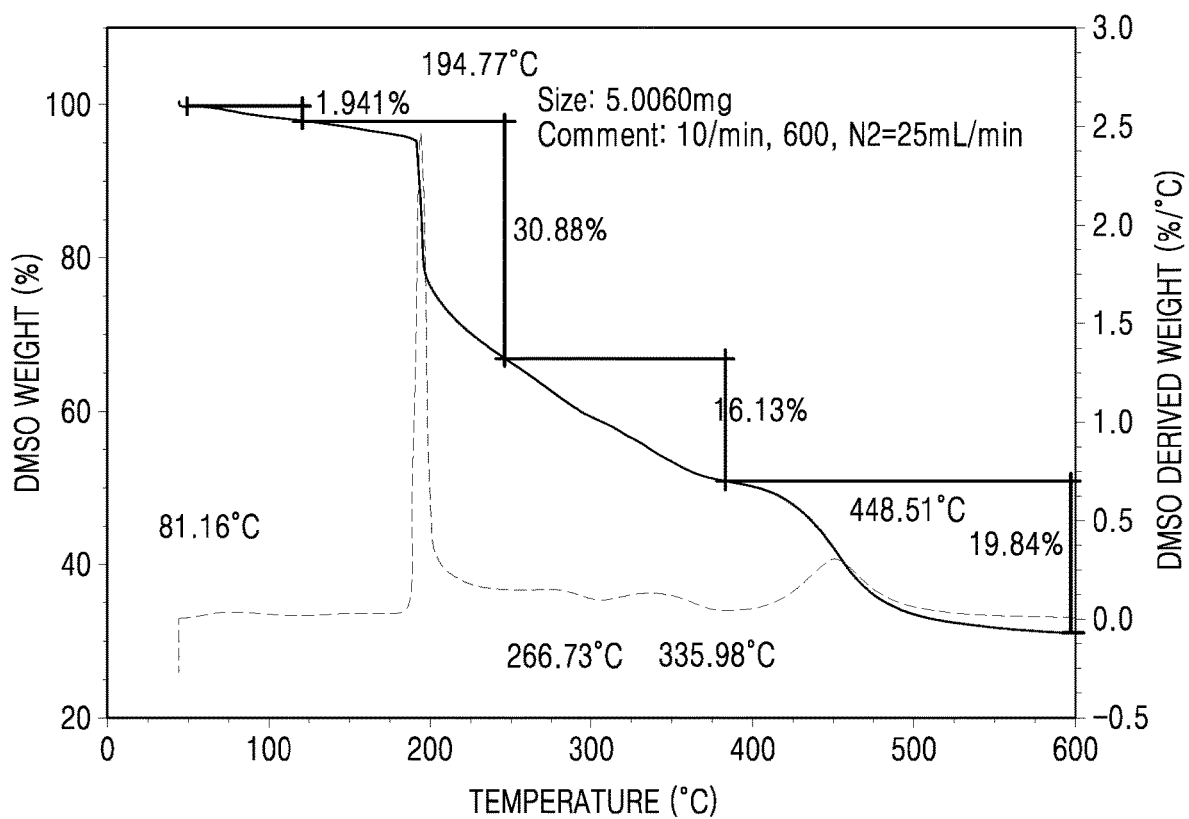
FIG. 16 is a graph illustrating DMSO weight (%) versus temperature and DMSO derived weight (%/° C.) as determined by thermogravimetric analysis (TGA) for a protective layer using a composition prepared according to Example 1.

The protective layer was subjected to TGA, and the results are shown in FIG. 16. Here, the device used for TGA was the Q-500 (TA Instruments).

Referring to FIG. 16, it was confirmed that the amount of DMSO in the finally obtained protective layer was about 5 wt %. When the amount of DMSO is within such a range, the protective layer may have high elongation, tensile modulus, and peel strength.

As described above, according to the one or more of the above embodiments, a negative electrode for a lithium metal battery maintains even current and ionic distribution on a surface of a lithium metal, and thus, may suppress growth of dendrites on the surface of the lithium metal and improve mechanical properties thereof. In addition, a protective layer including a poly(vinyl alcohol) (PVA) or a PVA blend has a good adhesive strength to a negative electrode including lithium, thereby evenly maintaining deposition of the lithium metal during charging of the lithium metal battery. Accordingly, the lithium metal battery may have improved lifespan characteristics.

It should be understood that exemplary embodiments described herein should be considered in a descriptive sense only and not for purposes of limitation. Descriptions of features or aspects within each exemplary embodiment may be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A lithium metal battery comprising:
a positive electrode;
a negative electrode comprising lithium;
a liquid electrolyte disposed between the positive electrode and the negative electrode; and
an amorphous protective layer disposed on at least a portion of the negative electrode, wherein the protective layer comprises a first polymer selected from at least one of poly(vinyl alcohol) and poly(vinyl alcohol) blend, and a lithium salt,
wherein the protective layer has an elongation of greater than or equal to 100% at a temperature of 25° C.,
wherein the glass transition temperature of polyvinyl alcohol in the amorphous protective layer is in a range of about 40° C. to about 80° C., and
wherein the protective layer has peaks at diffraction angles of about 12.5° 2-theta to about 27.5° 2-theta with a full width at half maximum of 3° to 7° as measured by X-ray diffraction analysis,
wherein a mixed weight ratio of the first polymer to the lithium salt is in a range of about 3:1 to about 3:8, and
wherein a molar ratio of hydroxyl groups of the first polymer to lithium is about 2:1 to about 13:1.

2. The lithium metal battery of claim 1, wherein a tensile modulus of the protective layer is greater than or equal to about 10.0 megapascals at a temperature of 25° C.

3. The lithium metal battery of claim 1, wherein a peel strength of the protective layer is greater than or equal to about 5.0 megapascals at a temperature of 25° C.

4. The lithium metal battery of claim 1, wherein an ion conductivity of the protective layer is greater than or equal to about $1 \times 10^{-5}$ Siemens per centimeter at a temperature of 25° C.

5. The lithium metal battery of claim 1, wherein a weight-average molecular weight of the first polymer is greater than or equal to about 30,000 Daltons.

6. The lithium metal battery of claim 1, wherein a saponification value of the first polymer is greater than or equal to about 85 mole percent.

7. The lithium metal battery of claim 1, wherein the poly(vinyl alcohol) blend comprises a poly(vinyl alcohol) and a second polymer, and the second polymer is at least one selected from an acryl resin, a methacryl resin, and poly (acrylonitrile).

8. The lithium metal battery of claim 7, wherein the second polymer is at least one selected from poly(methyl methacrylate), poly(methyl acrylate), poly(ethyl methacrylate), poly(ethyl acrylate), poly(propyl methacrylate), poly (propyl acrylate), poly(butyl acrylate), poly(butyl methacrylate), poly(pentyl methacrylate), poly(pentyl acrylate), poly (cyclohexyl methacrylate), poly(cyclohexyl acrylate), poly (hexyl methacrylate), poly(hexyl acrylate), poly(glycidyl acrylate), poly(glycidyl methacrylate), and poly(acrylonitrile).

9. The lithium metal battery of claim 7, wherein an amount of the second polymer in the poly(vinyl alcohol) blend is in a range of about 10 parts by weight to about 50 parts by weight based on 100 parts by weight of the first polymer.

10. The lithium metal battery of claim 1, wherein the lithium salt is at least one selected from LiSCN, $LiN(CN)_2$, $LiClO_4$, $LiBF_4$, $LiAsF_6$, $LiPF_6$, $LiCF_3SO_3$, $Li(CF_3O_2)_3C$, $LiN(SO_2O_2$, $LiN(SO_2CF_3)_2$, $LiN(SO_2CF_2CF_3)_2$, $LiSbF_6$, $LiPF_3(C_2F_5)_3$, $LiPF_3(CF_3)_3$, $LiB(C_2O_4)_2$ LiCl, and LiI.

11. The lithium metal battery of claim 1, wherein the protective layer has an amorphous structure.

12. The lithium metal battery of claim 1, wherein the protective layer has an elongation of at least 200% at a temperature of 25° C.

13. The lithium metal battery of claim 1, wherein the protective layer further comprises at least one selected from an inorganic particle, an ionic liquid, a polymer ionic liquid, and an oligomer.

14. The lithium metal battery of claim 13, wherein the inorganic particle comprises at least one selected from $SiO_2$, $TiO_2$, ZnO, $Al_2O_3$, $BaTiO_3$, a graphene oxide, a graphite oxide, a carbon nanotube, $Fe_2O_3$, CuO, a cage-structured silsesquioxane, and a metal-organic framework.

15. The lithium metal battery of claim 13, wherein the ionic liquid comprises a compound comprising at least one cation and at least one anion,
wherein the at least one cation is selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and
wherein the at least one anion is selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

16. The lithium metal battery of claim 13, wherein the oligomer is at least one selected from poly(ethylene glycol) dimethyl ether and poly(ethylene glycol) diethyl ether.

17. The lithium metal battery of claim 13, wherein the polymer ionic liquid comprises a repeating unit comprising at least one cation and at least one anion,
wherein the at least one cation is selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and
wherein the at least one anion is selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

18. The lithium metal battery of claim 1, wherein a thickness of the protective layer is in a range of about 1 micrometer to about 20 micrometers.

19. The lithium metal battery of claim 1, wherein an operating potential of the lithium metal battery is at least about 4.0 volts.

20. The lithium metal battery of claim 1, wherein the positive electrode comprises an electrolyte selected from at least one of a solid electrolyte, a gel electrolyte, and a polymer ionic liquid.

21. The lithium metal battery of claim 1, wherein the liquid electrolyte comprises at least one selected from an organic solvent, an ionic liquid, and a lithium salt.

22. The lithium metal battery of claim 1, wherein the liquid electrolyte comprises at least one selected from ethylene carbonate, propylene carbonate, dimethyl carbonate, diethyl carbonate, ethylmethyl carbonate, fluoroethylene carbonate, dimethoxyethane, diethoxyethane, diethylene glycol dimethylether, dipropylene glycol dimethyl ether, tetraethylene glycol dimethyl ether, polyethylene glycol dimethylether, succinonitrile, sulfolane, dimethyl sulfone, ethylmethyl sulfone, diethyl sulfone, adiponitrile, tetrahydrofuran, N-methylpyrrolidone, acetonitrile, benzonitrile, acetonitrile, 2-methyltetrahydrofuran, γ-butyrolactone, dioxolane, 4-methyldioxolane, N,N-dimethylformamide, N,N-dimethylacetamide, dimethylsulfoxide, dioxane, 1,2-dimethoxyethane, dichloroethane, chlorobenzene, nitrobenzene, diethylene glycol, dimethyl ether, and 1,1,2,2-tetrafluoroethyl 2,2,3,3-tetrafluoropropyl ether.

23. The lithium metal battery of claim 1, wherein the liquid electrolyte comprises at least one selected from ethylene carbonate, propylene carbonate, dimethyl carbonate, diethyl carbonate, ethylmethyl carbonate, fluoroethylene carbonate, gamma-butyrolactone, dimethoxyethane, diethoxyethane, diethylene glycol dimethylether, dipropylene glycol dimethyl ether, tetraethylene glycol dimethyl ether, polyethylene glycol dimethylether, dimethylether, 1,2-dimethoxy ethane, and 1,1,2,2-tetrafluoroethyl 2,2,3,3-tetrafluoropropyl ether.

24. The lithium metal battery of claim 1, wherein the lithium metal battery comprises a stack structure of i) the lithium negative electrode, ii) the protective layer comprising at least one first polymer selected from a poly(vinyl alcohol) and a poly(vinyl alcohol) blend, iii) the separator and the liquid electrolyte, and iv) the positive electrode, which are sequentially stacked.

25. The lithium metal battery of claim 1, wherein the lithium metal battery further comprises a separator.

26. A lithium metal battery comprising:
a positive electrode;
a negative electrode comprising lithium;
a liquid electrolyte disposed between the positive electrode and the negative electrode; and an amorphous protective layer disposed on at least a portion of the negative electrode, wherein the protective layer comprises a first polymer selected from at least one of poly(vinyl alcohol) and poly(vinyl alcohol) blend, and at least one lithium salt selected from at least one of LiSCN, $LiN(CN)_2$, $LiClO_4$, $LiBF_4$, $LiAsF_6$, $LiPF_6$, $LiCF_3SO_3$, $Li(CF_3SO_2)_3C$, $LiN(SO_2F)_2$, $LiN(SO_2CF_3)_2$, $LiN(SO_2CF_2CF_3)_2$, $LiSbF_6$, $LiPF_3(C_2F_5)_3$, $LiPF_3(CF_3)3$, $LiB(C_2O_4)_2$, LiCl, and LiI,
wherein the protective layer has an elongation of greater than or equal to 100% at a temperature of 25° C.,
wherein the glass transition temperature of polyvinyl alcohol in the amorphous protective layer is in a range of about 40° C. to about 80° C.,
wherein the protective layer has peaks at diffraction angles of about 12.5° 2-theta to about 27.5° 2-theta with a full width at half maximum of 3° to 7° as measured by X-ray diffraction analysis,
wherein a mixed weight ratio of the first polymer to the lithium salt is in a range of about 3:1 to about 3:8, and
wherein a molar ratio of hydroxyl groups of the first polymer to lithium is about 2:1 to about 13:1.

27. A lithium metal battery comprising:
a positive electrode;
a negative electrode comprising lithium;
a liquid electrolyte disposed between the positive electrode and the negative electrode; and
an amorphous protective layer disposed on at least a portion of the negative electrode, wherein the protective layer comprises a first polymer selected from at least one of (vinyl alcohol) and poly(vinyl alcohol) blend, and lithium salt, wherein PVA and a lithium salt were mixed at a mixed weight ratio of about 3:1 to about 3:4,
wherein the protective layer has an elongation of greater than or equal to 100% at a temperature of 25° C.,
wherein the glass transition temperature of polyvinyl alcohol in the amorphous protective layer is in a range of about 40° C. to about 80° C.,
wherein the protective layer has peaks at diffraction angles of about 12.5° 2-theta to about 27.5° 2-theta with a full width at half maximum of 3° to 7° as measured by X-ray diffraction analysis, and
wherein a molar ratio of hydroxyl groups of the first polymer to lithium is about 2:1 to about 13:1.

* * * * *